United States Patent
Jaroch et al.

(10) Patent No.: US 10,257,224 B2
(45) Date of Patent: *Apr. 9, 2019

(54) METHOD AND APPARATUS FOR PROVIDING FORENSIC VISIBILITY INTO SYSTEMS AND NETWORKS

(71) Applicant: WEBROOT INC., Broomfield, CO (US)

(72) Inventors: Joseph Jaroch, Deer Park, IL (US); Jacques Etienne Erasmus, Belper (GB); Paul Barnes, Derby (GB); Johannes Mayr, Linz (AT); Michael Leidesdorff, Niwot, CO (US); Marco Giuliani, Bastia Umbra (IT); Christopher Jon Williams, Derbyshire (GB); Chad Edward Bacher, Arvada, CO (US)

(73) Assignee: Webroot Inc., Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/437,275

(22) Filed: Feb. 20, 2017

(65) Prior Publication Data

US 2017/0163660 A1 Jun. 8, 2017

Related U.S. Application Data

(63) Continuation of application No. 14/270,069, filed on May 5, 2014, now Pat. No. 9,578,045.
(Continued)

(51) Int. Cl.
*G06F 21/00* (2013.01)
*H04L 29/06* (2006.01)
*G06F 21/56* (2013.01)

(52) U.S. Cl.
CPC ............ *H04L 63/145* (2013.01); *G06F 21/56* (2013.01); *H04L 63/1416* (2013.01); *H04L 63/1425* (2013.01)

(58) Field of Classification Search
CPC . H04L 63/1416; H04L 63/20; H04L 63/1425; H04L 63/1441; H04L 63/1408;
(Continued)

(56) References Cited

U.S. PATENT DOCUMENTS 7,895,649 B1 2/2011 Brook et al.
9,578,045 B2 2/2017 Jaroch et al.
(Continued)

FOREIGN PATENT DOCUMENTS

WO 2006094228 9/2006
WO 2012110501 8/2012

OTHER PUBLICATIONS

European Extended Search Report in Application 14791882.5, dated Nov. 11, 2016, 8 pages.
(Continued)

*Primary Examiner* — Ghazal B Shehni

(57) ABSTRACT

Methods and systems for providing forensic visibility into systems and networks are provided. More particularly, a sensor agent may receive events defining an action of a first object acting on a target. The object, the event, and the target are then correlated to at least one originating object such that an audit trail for each individual event is created. A global perspective indicating an age, popularity, a determination as to whether the object may be malware, and IP/URL information associated with the event may then be applied to at least one of the object, the event, the target, and the originating object. A priority may then be determined and assigned to the event based on at least the global perspective. An event line containing event information is then trans-
(Continued)

mitted to an end recipient where the information may be heuristically displayed.

20 Claims, 15 Drawing Sheets

Related U.S. Application Data

(60) Provisional application No. 61/819,470, filed on May 3, 2013.

(58) Field of Classification Search
CPC ... H04L 63/1433; H04L 63/145; H04L 63/14; H04L 9/3271; H04L 12/2602
See application file for complete search history.

(56) References Cited

U.S. PATENT DOCUMENTS

| | | | |
|---|---|---|---|
| 2006/0095963 A1 | 5/2006 | Crosby et al. | |
| 2008/0016570 A1* | 1/2008 | Capalik | H04L 63/1408 726/23 |
| 2008/0244694 A1 | 10/2008 | Neystadt et al. | |
| 2009/0300769 A1 | 12/2009 | Srinivasa et al. | |
| 2012/0072725 A1 | 3/2012 | Fanton et al. | |
| 2012/0260340 A1 | 10/2012 | Morris et al. | |
| 2013/0247201 A1* | 9/2013 | Alperovitch | H04L 63/14 726/24 |
| 2013/0298244 A1* | 11/2013 | Kumar | G06F 21/52 726/25 |

OTHER PUBLICATIONS

PCT International Preliminary Report on Patentability in PCT/US2014/036832, dated Nov. 3, 2015, 8 pages.

PCT International Search Report in PCT/US2014/036832, dated Sep. 29, 2014, 9 pages.

U.S. Appl. No. 14/270,069, Amendment and Response filed Mar. 16, 2016, 16 pages.

U.S. Appl. No. 14/270,069, Amendment and Response filed Aug. 31, 2016, 13 pages.

U.S. Appl. No. 14/270,069, Notice of Allowance dated Oct. 5, 2016, 8 pages.

U.S. Appl. No. 14/270,069, Office Action dated Sep. 16, 2015, 12 pages.

U.S. Appl. No. 14/270,069, Office Action dated May 31, 2016, 11 pages.

European Office Action in Application 14791882.5, dated Dec. 8, 2017, 6 pages.

European Communication in Application 14791882.5, dated Nov. 16, 2018, 5 pages.

\* cited by examiner

METHOD AND APPARATUS FOR PROVIDING FORENSIC VISIBILITY INTO SYSTEMS AND NETWORKS

CROSS-REFERENCE TO RELATED APPLICATIONS

This application is a continuation application of U.S. patent application Ser. No. 14/270,069, filed May 5, 2014, which application claims the benefit of U.S. Provisional Patent Application Ser. No. 61/819,470, filed May 3, 2013, the entire disclosures of which are hereby incorporated herein by reference in their entireties.

FIELD

Methods and apparatuses for providing forensic visibility are described. More particularly, methods and systems for providing forensic visibility into client systems having full audit trails are described.

BACKGROUND

Network forensics generally relates to the capture, recording, and analysis of network events in order to discover the source of security attacks or other problem incidents. Network forensic systems generally utilize one of two approaches: the "catch it as you can approach" and the "stop, look, and listen approach." "Catch it as you can" systems immediately write the packets to a disk file, buffering in memory as necessary, and perform analysis in batches. "Stop, look and listen" systems analyze the packets in memory, perform rudimentary data analysis and reduction, and write selected results to disk or to a database over the network.

However, existing network forensic tools, such as network sniffers and packet capturing tools, passively collect information about network traffic. Such tools may be able to detect and capture information associated with communication sessions, such as hostnames, ports, protocols, IP addresses, etc.; however, such tools tend to receive network events outside of a host or system. That is, a network forensic tool, such as a network sniffer, may reside at a network edge and may receive network events concerning the network from one or more hosts or systems. Accordingly, network edge devices have no ability to establish any sort of context from within the host or system that is generating the event. Therefore, devices residing at a network edge may monitor, record, and or analyze network traffic between the host and the device, but information that may be useful within the host is not obtained.

For example, FIG. 1 generally illustrates a comparative example including computing devices 104 and 108 in communication with a network edge device 116. The network edge device 116 may be commonly referred to as a "sniffer" which may monitor, capture, and analyze network traffic between the network edge device 116 and the computing devices 104 and 108. The network edge device 116 may further be in communication with a communication network 124, such as the internet. Accordingly, the network edge device 116 may monitor, capture, and analyze network traffic between the computing devices 104 and 108 and between the computing devices 104/108 and the communication network 124.

However, as previously mentioned, the network edge device 116 has no ability to monitor, capture, and/or analyze what is occurring within each of the computing device 104 and 108. In at least one comparative example, computing device 108 may contain or otherwise be infected with one or more pieces of malware. The term "malware" is used herein to refer generally to any executable computer file or, more generally "object", that is or contains malicious code, and thus includes viruses, Trojans, worms, spyware, adware, etc. and the like. Indeed, the network edge device 116 may be able to monitor, capture, and analyze communication traffic including the information, both encrypted and unencrypted, source and destination ports, source and destination IP address, and protocols utilized by the computing device 108, but the network edge device cannot provide details regarding files modified, registry entries changed, and/or new processes that are created. Accordingly, the network edge device 116 has no way of knowing to what extent the virus may have impacted the computing device 108, what additional files may have become infected, or what processes and/or objects operating are linked to the virus. What is needed therefore, is a solution that eliminates the guesswork and allows for end-to-end visibility of every event within a system and/or within a network.

SUMMARY

It is, therefore, one aspect of the present disclosure to provide a system and method whereby events occurring within a computing device are captured and additional context and a global perspective is provided for each capture event. For example, a sensor agent may provide visibility into occurrences across an environment, such as a networked environment, to ensure that an administrator is aware of any system changes and data communication in and out of computing devices residing on the network. In this implementation, six components, or modules, may be utilized in the event gathering and processing: low level system filters, a local aggregator and interpreter, a context analyzer, a global perspective module, an event priority module, and an event distributor may be utilized to provide forensic visibility into one or more computing devices of a communication network.

The system filters may be built upon the same or similar technology related to behavior monitoring and collection, as discussed in U.S. application Ser. No. 13/372,375 filed Feb. 13, 2012, "Methods and Apparatus for Dealing with Malware" (US-2012-0260340-A1), which is incorporated herein by reference in its entirety for all that it teaches and for all purposes. These filters intercept system events in a manner such that the operation of the system filter does not impact system performance, a key aspect of this solution. Events at this level tend to be very raw and generally not individually useful—on an average system, tens of millions of events take place every minute and the noise ratio can prevent forensic solutions from being able to provide sufficient value to the end consumer of their data due to the inability to quickly find important events. A product which impacts system performance will have considerably diminished value to an administrator and can negatively affect the results of an analysis undertaken. For example, a system filter that requires a majority of the available computing and system resources may render one or more communication devices unable to perform its primary function and may steer a real-time forensics analysis to an irrelevant analysis of events; irrelevant because such event analysis of information may be based on old and outdated event information. In some embodiments, events are gathered and timestamped accurately and sequentially, establishing a chronological order of system events for consumption at a higher level.

In at least one embodiment, the second component, the local aggregator and interpreter, receives events from the low level system filters, collecting them in batches from the queues in which they are inserted in real-time, and transmits these events to a local service process where the events are held for further analysis. At this stage, intelligent caching may be invoked to drop events which are duplicates of recent events, and some data normalization may be performed to ensure consistency. Caching may be implemented sparingly but in critical areas to ensure redundant events are not continually reported—many applications perform thousands of the same events (network access to the same destination IP address, for example) and transmitting these events into an external log source would create a significant amount of unnecessary noise and potential performance degradation. The cache may integrate a "time to live" concept to prevent applications from hiding their traffic within their noise. The caches may automatically roll over to ensure sufficient space is always available without requiring exorbitant amounts of memory.

In addition, data normalization takes items such as kernel filenames, usermode filenames, process objects, registry objects, and other system structures and normalizes them into a standard format which is easy more easily consumed by automated parsers. Consolidating and normalizing data at this stage allows the data to be handled much more quickly at the higher levels to avoid reprocessing data and potentially missing events just because they were referred to slightly differently (\Device\HarddiskVolume1\Windows\file.exe instead of C:\Windows\file.exe for example). In some embodiments, an aspect of this subsystem provides the ability to process events asynchronously. The subsequent modules which will execute over the data can potentially take a considerable amount of time to complete but delaying the response for each event at this phase would result in a significant system slowdown. Instead, events are intelligently queued in multiple layers to minimize the number of individual threads but still ensure each event is given sufficient time to be independently processed. Because of this structure, there is no performance difference if an event takes one millisecond to be processed or one hour for the full series of routines to complete.

In at least some embodiments, the context analyzer is utilized to ensure that a user, such as a network administrator, is provided the deepest view of the most important data but still has access to the full range of data if they wish to see it. The analysis starts by correlating events to objects (their originating processes, devices, and users), and creating an audit trail for each individual event. This allows an administrator to forensically track back any event which occurs to what triggered it. As previously discussed, conventional products in this space receive events outside of the system (for example, as a network edge device) and therefore have no ability to establish context within the system. The present solution eliminates the guesswork and allows for end-to-end visibility of every event from the bottom of the stack to the top. As contextual state is established, it is cached and aggregated to be quickly queried in subsequent lookups further reducing latency and improving the responsiveness of the system.

After the contextual analysis completes, the sensor agent attempts to establish a global perspective for each event by calling the cloud database using an infrastructure similar to the infrastructure discussed in U.S. application Ser. No. 13/372,375 filed Feb. 13, 2012, "Methods and Apparatus for Dealing with Malware" (US-2012-0260340-A1), but with an additional layer capable of responding in a highly scalable manner which avoids the overhead generally associated with the complex rule processing within the overall database. This response includes information related to the age, popularity, and determination of an object—whether it is known good, bad, or unknown. This data may then be normalized and appended to each relevant portion of the event line. Further lookups are performed for network activity, assessing the reputation and category of each website and IP address as they are contacted.

The event priority module may contain priority logic, or one or more rule sets, to associate a priority to one or more events. The event priority module may utilize information from the local aggregator and interpreter, the context analysis module, and the global perspective module, to determine, or otherwise assign, a priority to an event; such a priority may be based on a rule set. The rule set may be provided by an administration system, backend system, end recipient 220, or other component of a forensic system.

The event distributor may then batch and transmit the events to the end recipient after the global perspective has been applied. In some embodiments, the event distributor may batch and transmit the events to the end recipient after the even priority has been determined. In one implementation, a syslog protocol may be used to send each event as a line of log data to be processed by an end consumer—usually a display/query engine. The transmission of events requires an additional layer of asynchronous processing as the response time from the recipient cannot be allowed to slow down the higher level global perspective and contextual analysis work which is ongoing in other threads. Therefore, a transmission engine of the event distributor may build the final event line, packages it together with information about the host itself, and then send it directly into a separate queue where it will then be sent shortly after (usually a few seconds) while maintaining the pre-set timestamp of precisely when the event took place even if it is sent several seconds later.

The recipient of the event, whether hosted on a third party platform or using other proprietary software, may then display single events and/or perform wider analysis on groups of events, producing dashboard views and graphs to aid the administrator in identifying events that are most pertinent to their current investigation.

In accordance with at least one embodiment of the present disclosure, a method is provided, the method comprising gathering one or more events defining an action of a first object acting on a target; generating a contextual state for at least one of the one or more events by correlating the at least one event to an originating object, the contextual state including an indication of the originating object of the first object and an indication of at least one of a device on which the first object is executed and a user associated with the first object; obtaining a global perspective for the at least one event by obtaining information associated with one or more of the first object and the originating object, the information including at least one of age, popularity, a determination as to whether the first object is malware, a determination as to whether the originating object is malware; and Internet Protocol (IP) Address or Uniform Resource Locator (URL) information; assembling an event line including details associated with the at least one event, the details including information uniquely identifying each of the first object, the action of the first object, the target, and the originating object; and transmitting the assembled event line.

In accordance with further embodiments of the present disclosure, a system is provided, the system comprising a device including a communication interface; a processor; data storage; and a sensor agent stored on the data storage that is executable by the processor, wherein the sensor agent is operable to: gather one or more events defining an action of a first object acting on a target; generate a contextual state for at least one of the one or more events by correlating the at least one event to an originating object, the contextual state including an indication of the originating object of the first object and an indication of at least one of a device on which the first object is executed and a user associated with the first object; obtain a global perspective for the at least one event by obtaining information associated with one or more of the first object and the originating object, the information including at least one of age, popularity, a determination as to whether the first object is malware, a determination as to whether the originating object is malware; and Internet Protocol (IP) Address or Uniform Resource Locator (URL) information; assemble an event line including details associated with the at least one event, the details including information uniquely identifying each of the first object, the action of the first object, the target, and the originating object; and transmit the assembled event line utilizing the communication interface.

In accordance with further embodiments of the present disclosure, a system is provided, the system comprising a device including a communication interface; a processor; data storage; and a sensor agent stored on the data storage that is executable by the processor, wherein the sensor agent is operable to: gather one or more events defining an action of a first object acting on a target; generate a contextual state for at least one of the one or more events by correlating the at least one event to an originating object, the contextual state including an indication of the originating object of the first object and an indication of at least one of a device on which the first object is executed and a user associated with the first object; assemble an event line including details associated with the at least one event, the details including information uniquely identifying each of the first object, the action of the first object, the target, and the originating object; and transmit the assembled event line utilizing the communication interface.

In accordance with at least one embodiment of the present disclosure, a method is provided, the method comprising obtaining an event line from one or more computing systems; parsing the event line to retrieve event information for at least one event, wherein the event information includes an event type, a contextual state for the event, a global perspective for the event, and a priority for the event; and displaying the event information for the at least one event to a display device.

In accordance with further embodiments of the present disclosure, a system is provided, the system comprising a device including a communication interface; a processor; data storage; a display device; and a parser stored on the data storage that is executable by the processor, wherein the parser is operable to: obtain an event line from one or more computing systems utilizing the communication interface; parse the event line to retrieve event information for at least one event, wherein the event information includes an event type, a contextual state for the event, a global perspective for the event, and a priority for the event; wherein the processor is operable to cause the event information for the at least one event to be displayed at a display device.

Additional features and advantages of embodiments of the present invention will become more readily apparent from the following description, particularly when taken together with the accompanying drawings.

DETAILED DESCRIPTION

Figure 1:
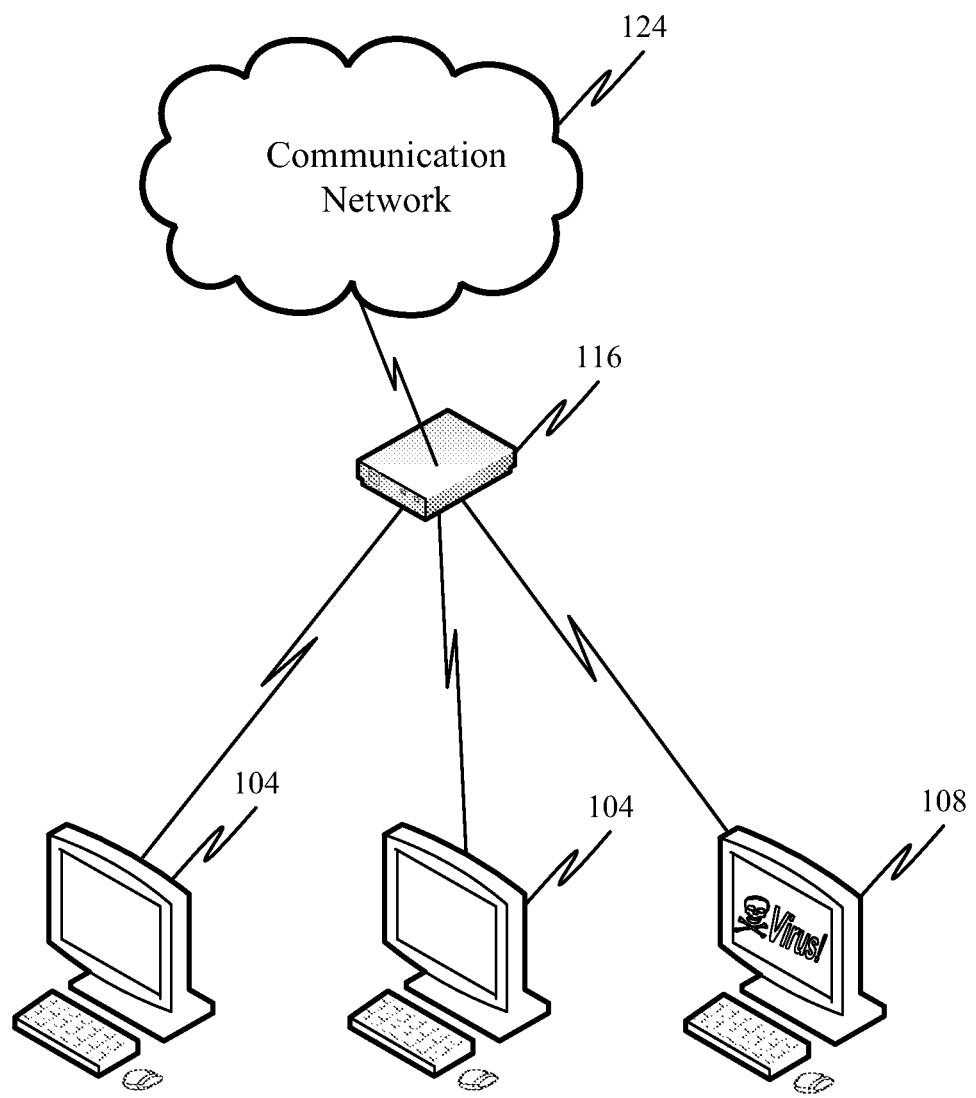
FIG. 1 illustrates a comparative example of a communication network, edge device, and one or more computing devices.
Figure 2:
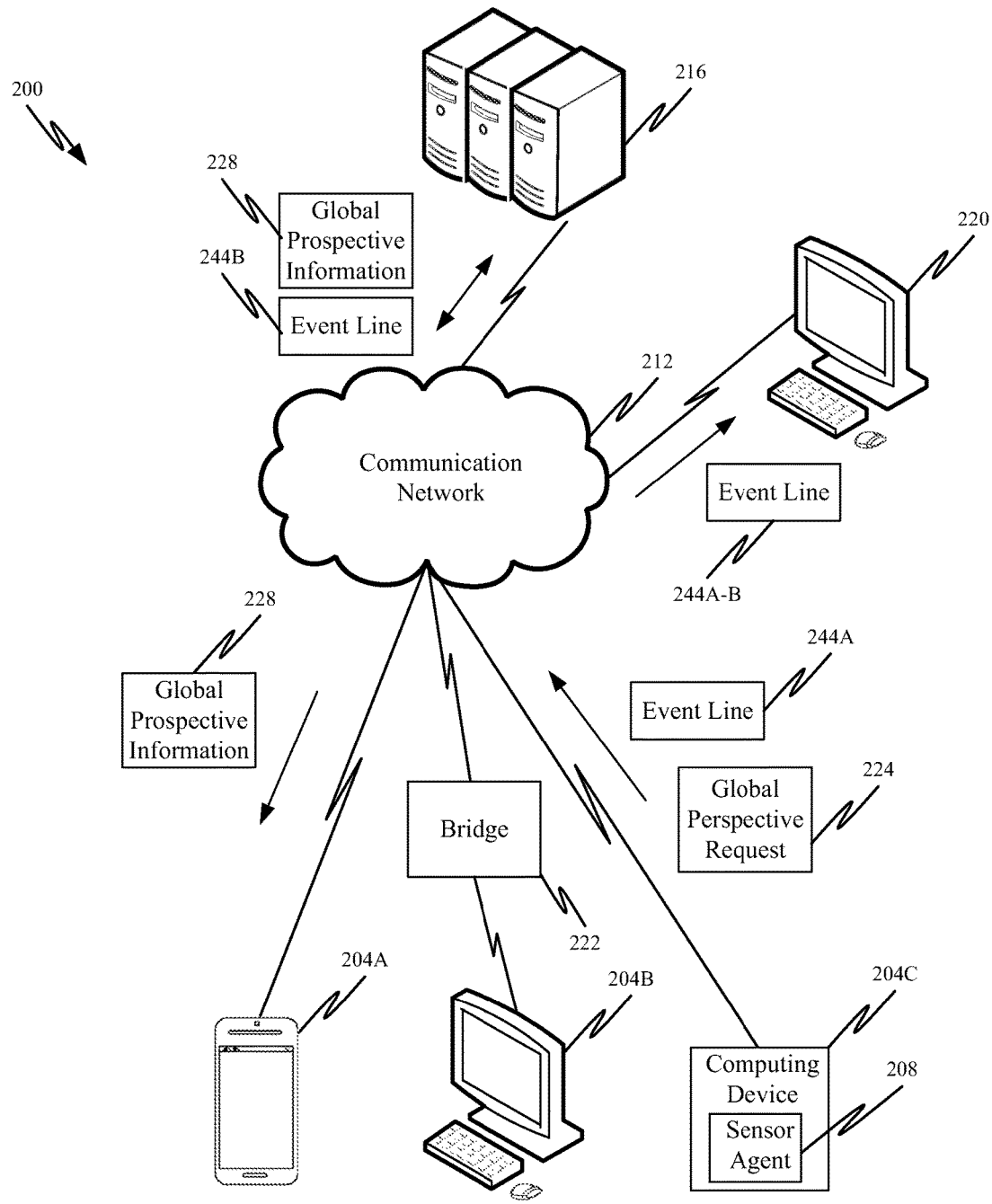
FIG. 2 depicts a communication network including one or more computing systems, global perspective information server, and one or more end recipients in accordance with an exemplary embodiment of the present disclosure.

FIG. 1 depicts aspects of a system 200 for providing forensic visibility into one or more computing devices 204, 208, and 212 in accordance with at least one embodiment of the present disclosure. In general, the system 200 includes one or more computing device 204, each of which are interconnected to a global perspective information server 216 and end recipient 220 by one or more communication networks 212. The computing device 204 may comprise a general purpose computer, such as but not limited to a laptop or desktop personal computer 204B, a tablet computer, a smart phone 204A, or other device capable of communications over a communication network 212 and capable of presenting content to an associated user. The computing device 204 may also comprise a processing unit that is interconnected to an affiliated input/output device.

The communication network 212 may include one or more networks capable of supporting communications between nodes of the system 200, including but not limited to a computing devices 204A-C, the global perspective information server 216 and the end recipient 220. Examples of communication networks 212 include the Internet or any wide area network (WAN), local area network (LAN), or networks in various combinations. Other examples of communication networks 212 in accordance with embodiments of the present disclosure include wireless networks, cable networks, satellite networks, and digital subscriber line (DSL) networks. In addition, different communication networks 212 may share a common physical infrastructure, for at least some portion of the physical network. For instance, a computing device 204 may be interconnected to a communication network 212 comprising the Internet and to a separate communication network between the computing device 204 and an end recipient 220.

The computing device 204 includes and/or executes a sensor agent 208 in connection with the presentation of content to the user. In accordance with at least one embodiment of the present disclosure, six components, or modules, may be utilized by the sensor agent 208 to gather and process events. The sensor agent 208 may include, but is not limited to, low level system filters, a local aggregator and interpreter, a context analyzer, a global perspective module, an event priority module, and an event distributor. Of course, and as can be appreciated by those skilled in the art, all six modules may not be required by the sensor agent 208. In at least one embodiment, the sensor agent may comprise fewer than six modules. That is, at least some functionality of the one or more modules may be provided by another device, such as a global perspective information server 216 for example. Moreover, it should be understood that the sensor agent 208 may include varying combination of modules. For example, the sensor agent 208 may include two of the six modules, three of the six modules, four of the six modules, or five of the six modules.

The system filters may intercept system events in a manner such that they do not impact system performance. Events may define those actions or behaviors of an object acting upon another object or some other entity. An object in this sense may be a computer file, part of a file or a sub-program, macro, web page or any other piece of code to be operated by or on the computer, or any other event whether executed, emulated, simulated or interpreted. Events may include, but are not limited to file activity, registry events, code events, network/internet events, process/thread events, window/GDI events, input events to name a few. An event may have three principal components: information and/or details describing the object performing the act (the "Actor"), information and/or details describing the act being performed (the "Event Type"), and information and/or details describing the object or identity of another entity upon which the act is being performed (the "Victim" or "Target"). For example, the event data might capture the identity, e.g. the IP address or URL, of a network entity with which an object is communicating, another program acting on the object or being acted on by the object, a database or IP registry entry being written to by the object, etc. While simple, this structure allows a limitless series of behaviors and relationships to be defined. Examples of the three components of an event might include, but are not limited to, those illustrated in Table 1.

TABLE 1

| Actor | Event Type | Victim |
| --- | --- | --- |
| Object 1 | Creates Program | Object 2 |
| Object 1 | Sends data | IP Address 3 |
| Object 1 | Deletes Program | Object 4 |

TABLE 1-continued

| Actor | Event Type | Victim |
| --- | --- | --- |
| Object 1 | Executes | Object 2 |
| Object 2 | Creates registry key | Object 4 |

Moreover, in some embodiments, the Actor, Event Type, and/or Victim may be represented in the form of a so-called signature or key relating to the object key. Key generation is mainly to keep the data storage and transmission requirements as minimal as possible. The keys for each object may be formed by a hashing function operating on the object at the computing system 204. Accordingly, an event may include the three principal components as a key of the object performing the act (the "Actor"), a key of the act being performed (the "Event Type"), and the key of the object or identity of another entity upon which the act is being performed (the "Victim" or "Target"). Additionally, events at this level tend to be very raw and generally not individually useful—on an average system, tens of millions of events take place every minute and the noise ratio can prevent forensic solutions from being able to provide sufficient value to the end consumer of their data due to the inability to quickly find important events. Accordingly, in some embodiments, events are gathered and time stamped accurately and sequentially, establishing a chronological order of system events for consumption at a higher level.

The second component, the local aggregator and interpreter, receives events from the low level system filters in batches from the queues in which they are inserted in real-time and transmits them to the local service process where they are held for further analysis. In accordance with at least some embodiments of the present disclosure, the events may be cached and normalized such that kernel filenames, user mode filenames, process objects, registry objects, and other system structures are converted into a standard format for ease of consumption by one or more automated parsers. Following the aggregation and interpretation of the events, the context analyzer creates, or obtains, a contextual state by correlating events to objects and creating an audit trail for each individual event. In some instances, the sensor agent 208 of the computing device 204 may determine if contextual state information is available locally within a cache. If the contextual state information is not available locally, the sensor agent 208 of the computing device may obtain such contextual state information from a source of contextual state information accessible to the sensor agent 208.

Contextual state information may include, but is not limited to, originating processes, devices, and users. Additionally, contextual state information may include GenesisActor information and ancillary data. GenesisActor information may contain the object that is not the direct Actor of an event but which is the ultimate parent of the event being performed. For example in the case of a software installation, the GenesisActor would be the object that the user or system first executed and that initiated the software installation process, e.g. Setup.exe. Ancillary data may include data associated with the event type, actor and victim. For example, an event such as that used to record the creation of a registry run key may identify the Actor object as creating a registry run key, the event type itself (e.g. "regrunkey"), and the Victim or subject of the registry run key. The ancillary data in this case would define the run key entry itself; the Hive, Key name and Value. As a contextual state is established for each event, the contextual state may be cached and aggregated to be quickly queried in subsequent lookups further reducing latency and improving the responsiveness of the computing device 204. Contextual state information may be provided by the sensor agent 208 and/or a source of contextual state information accessible to the sensor agent 208. For example, the global perspective information server 216, in some embodiments, may be able to provide contextual state information to the sensor agent 208 for one or more events. Moreover, such contextual state information may be provided from one or more other computing devices 204.

After the contextual analysis completes, the sensor agent 208 establishes a global perspective for each event by calling on the global perspective information server 224. For example, the sensor agent 208 of the computing device 204 may determine if global perspective information is available locally within a cache. If the global perspective information is not available locally, the sensor agent 208 of the computing device 204 may issue a global perspective request 224 utilizing the communication network 212 and destined for the global perspective information server 216. The global perspective information server 216 may respond with global prospective information 228 and such information may be provided to the sensor agent 208 associated with the computing device 204.

The global perspective information 228 may include information related to the age, popularity, and determination of an object of the event—whether it is known good, bad, or unknown. The global perspective information may be retrieved or otherwise obtained for each object of an event and any objects provided as a part of a contextual information state. In some instances, the reputation and category of each website and IP address are obtained as they are contacted. Such information may then be normalized.

The event priority module may contain priority logic, or one or more rule sets, to associate a priority to one or more events. The event priority module may utilize information from the local aggregator and interpreter, the context analysis module, and the global perspective module, to determine, or otherwise assign, a priority to an event; such a priority may be based on a rule set. The rule set may be provided by an administration system, backend system, end recipient 220, or other component of a forensic system. For example, a rule set may determine that an event meeting certain conditions be assigned a priority according to a scale of severity. For instance, a rule set may specify that an event having a specific actor, victim, and/or origination process together with a global perspective indicating a specified age, popularity, malware determination, and/or IP/URL reputation be assigned an event priority representative of a potential risk assigned to the computing device 204 and/or network. Accordingly, when the event line containing event priority information is received at an end recipient 220, the end recipient 220 may be able to more easily identify events, and/or instances of malware, that require more immediate attention.

An event distributor of the sensor agent 208 may then create an event line comprising information from the event, information from the contextual state, information from the global perspective, and information from regarding the priority of the event. Alternatively, or in addition, an event distributor of the global perspective information server 216 may create an event line comprising information from the event, information from the contextual state, and information from the global perspective.

Accordingly, once the event distributor of the sensor agent 208 and/or the event distributor of the global perspective information server 216 create the event line for at least one event, the event line 244A-B may be sent to an end recipient 220 from the computing device 204 and/or the global perspective information server 216. The event distributor may batch and transmit the events to the end recipient 220 after the global perspective has been applied. In at least one implementation, the syslog protocol is utilized to send each event as a line of log data to be processed by an end consume such as a display/query engine like the product "splunk".

Alternatively, or in addition, some embodiments of the present disclosure may feature an optional bridge 222 which may be a dedicated device residing locally on a network. The bridge 222 may aggregate communications to and from one or more computing system 204 such that information to and from sensor agent 208 is cached at the bridge 222, optimizing global perspective requests and other communications. That is, the bridge may be shared across some or all devices in a network. In some embodiments, the bridge 222 may act as a local cache or data store for caching requests to the global perspective information server 216 and event lines directed to the end recipient 220. Additionally, the bridge 222 may perform selective or intelligent caching of global perspective information such that subsequent lookups or requests of global perspectives may be served from the local cache of the bridge 222.

Figure 3:
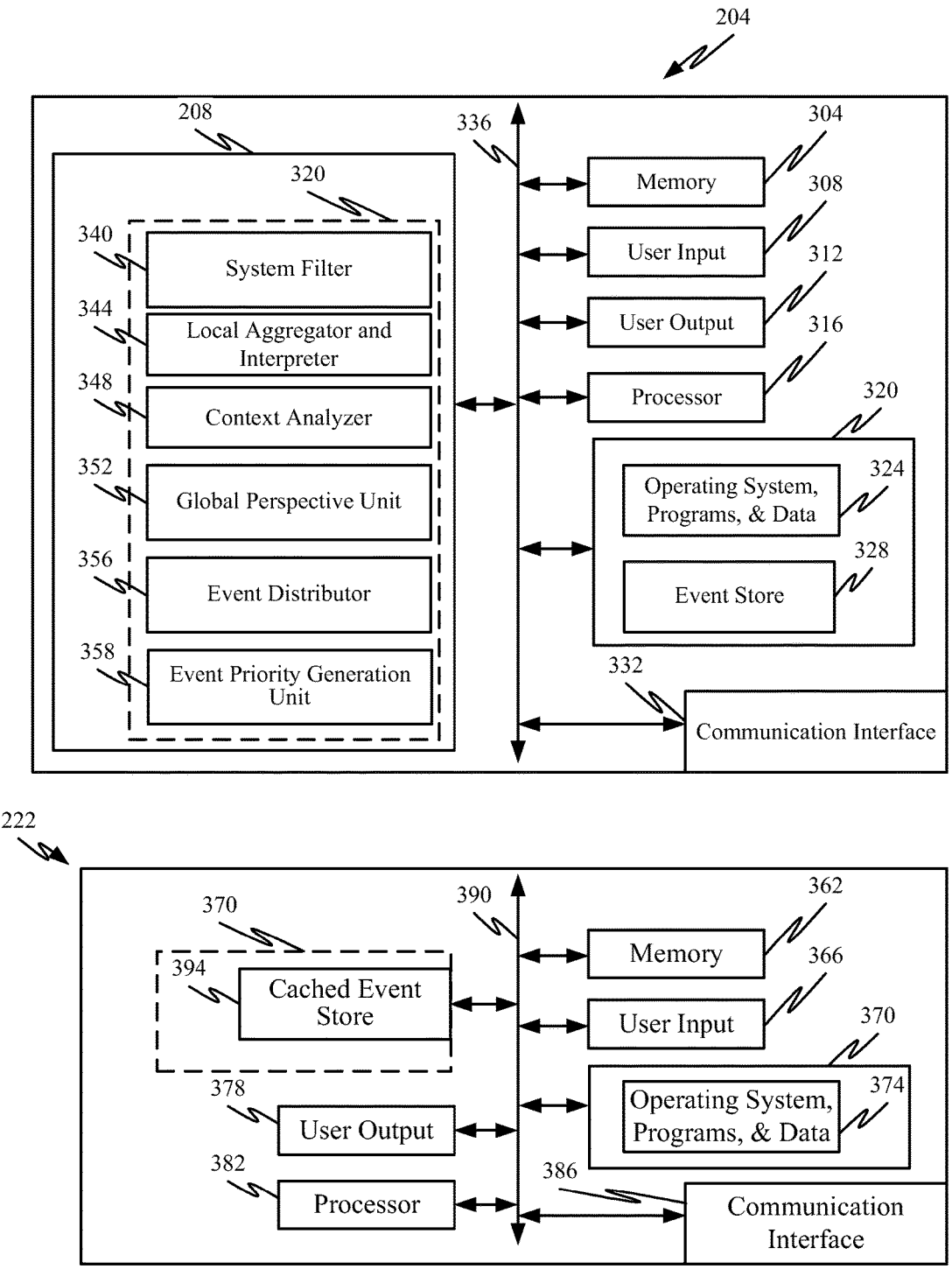
FIG. 3 illustrates a block diagram depicting details of a computing system and a bridge in accordance with an exemplary embodiment of the present disclosure.

FIG. 3 illustrates additional aspects of a system 200 in accordance with embodiments of the present invention, and in particular illustrates additional features and components of a computing device 204 and a bridge 222. The computing device 204 may comprise a general purpose computer, tablet computer, smart phone, or other device or federated group of devices capable of supporting communications over a communication network 212. The computing device 204 may include a processor 316, memory 304, one or more user input devices 308, such as a keyboard and a pointing device, and one or more user output devices 312, such as a display, speaker, and/or printer. Alternatively, or in addition, the user input 308 and the user output 312 may be combined into one device, such as a touch screen display. Computing device 204 may further include a communication interface 328 for communicating with another computing device 204, a global perspective information server 216, an end recipient 220, and/or the communication network 212.

Processor 316 is provided to execute instructions contained within memory 304 and/or storage 320. As such, the functionality of the computing device is typically stored in memory 304 and/or storage 320 in the form of instructions and carried out by the processor 304 executing such instructions. Accordingly, the processor 316 may be implemented as any suitable type of microprocessor or similar type of processing chip. One example of the processor 304 may include any general-purpose programmable processor, digital signal processor (DSP) or controller for executing application programming contained within memory 304 and/or storage 320. Alternatively, or in addition, the processor 316, memory 304, and/or storage 320, may be replaced or augmented with an application specific integrated circuit (ASIC), a programmable logic device (PLD), or a field programmable gate array (FPGA).

The memory 304 generally comprises software routines facilitating, in operation, pre-determined functionality of the computing device 204. The memory 304 may be implemented using various types of electronic memory generally including at least one array of non-volatile memory cells (e.g., Erasable Programmable Read Only Memory (EPROM) cells or FLASH memory cells, etc.). The memory 304 may also include at least one array of dynamic random access memory (DRAM) cells. The content of the DRAM cells may be pre-programmed and write-protected thereafter, whereas other portions of the memory may selectively be modified or erased. The memory 304 may be used for either permanent data storage and/or temporary data storage.

The data storage 320 may generally include storage for programs and data. For example, data storage 320 may provide storage for a sensor agent 208 including the system filters 340, the local aggregator and interpreter 344, the context analyzer 348, the global perspective module 352, the event distributor 356, and/or the general operating system and other programs and data 324. Additionally, the data storage 320 may also include an event store 328, such as a database, for storing and/or caching event information, context information, global perspective information, and/or event lines. One or more components of the computing device 204 may communicate with one another utilizing a bus 336. Alternatively, or in addition, the sensor agent 208 may be provided separate and apart from data storage 320. That is, the sensor agent 208, including the system filters 340, the local aggregator and interpreter 344, the context analyzer 348, the global perspective module 352, the event priority generation unit 358, and the event distributor 356 may be implemented using a processor, such as a microprocessor 304. Accordingly, the microprocessor 304 may be specifically programmed to carry out one or more functions of the sensor agent 208. For example, the processor 304 may execute instructions associated with the sensor agent 208, including the system filters 340, the local aggregator and interpreter 344, the context analyzer 348, the global perspective module 352, the event priority generation unit 358, and the event distributor contained within memory 304 and/or storage 320. Alternatively, or in addition, the sensor agent 208, including the system filters 340, the local aggregator and interpreter 344, the context analyzer 348, the global perspective module 352, the event priority generation unit 358, and the event distributor 356 may share the processor 304.

The system filters 340 intercept system events in a manner such that they do not impact system performance. In some embodiments, events are gathered and time stamped accurately and sequentially such that a chronological order of system events is maintained and may be provided for consumption at a higher level. As one example, the time stamp may correspond to the time at which the event took place. Such a timestamp may be added to the event and/or maintained at an event line. Moreover, the system events may then be sorted according to event type and/or processing resources such that the system events are inserted, or stored, in a queue in real-time.

The local aggregator and interpreter receives events from the system filters 340, and collects the received events into batches from the queues in which they are inserted in real-time. The batches of events are then transmitted to a local service process where the events are held for further analysis. Such events may be held, or otherwise stored, within an event store 328. At this stage, intelligent caching may be invoked to drop events which are duplicates of recent events, and some data normalization may be performed to ensure consistency. Caching may be implemented sparingly but in critical areas to ensure redundant events are not continually reported—many applications perform thousands of the same events (network access to the same destination IP address, for example) and transmitting these events into an external log source would create a significant amount of unnecessary noise and potential performance degradation. The cache may integrate a "time to live" concept to prevent applications from hiding their traffic within their noise. For example, events meeting predefined criteria may be dropped from the real-time system event queues. In some embodiments, if the predefined criteria include determining if a system event is the same or otherwise matches a previous system event, then the event may be dropped. Additionally, if a duplicate event occurs within a specified time, the event may be dropped from the queue. Alternatively, or in addition, if the duplicate system event occurs within a specified period of time, the duplicate system event may be modified to reflect that the duplicate system event is the same as a previously occurring system event. Accordingly, the later occurring duplicate system event may receive all contextual state information and global perspective information without requiring all of the determinations and/or lookups of such information. However, a time-to-live (TTL) functionality may be implemented on a cache basis to ensure that cached events, or previous events having context and/or a global perspective, are current. Accordingly, not all previous events having contextual information may be available to provide contextual information to a current event. As another option, the later occurring duplicate system event may be modified in a manner such that when the later occurring duplicate system event is interpreted by the end recipient 220, the end recipient 220 may determine that the system event information may be the same as a previously parsed system event line. Accordingly, a full event line for the duplicate system event is not generated and/or transmitted saving bandwidth and information processing resources. Further, the caches may automatically roll over to ensure sufficient space is always available without requiring exorbitant amounts of memory.

The local aggregator and interpreter 344 may additionally perform data normalization on items such as kernel filenames, user mode filenames, process objects, registry objects, and other system structures and normalizes them into a standard format which is easy more easily consumed by automated parsers. Consolidating and normalizing data at this stage allows the data to be handled much more quickly at the higher levels to avoid reprocessing data and potentially missing events just because they were referred to slightly differently (\Device\HarddiskVolume1\Windows\file.exe instead of C:\Windows\file.exe for example). In some embodiments, an aspect of this subsystem provides the ability to process events asynchronously. The subsequent modules which will execute over the data may potentially take a considerable amount of time to complete but delaying the response for each event at this phase would result in a significant system slowdown. Instead, events are intelligently queued in multiple layers to minimize the number of individual threads but still ensure each event is given sufficient time to be independently processed. Because of this structure, there is little to no performance difference if an event takes one millisecond to be processed or one hour for the full series of routines to complete.

The context analyzer 348 ensures that a user at the end recipient 220 is provided with the deepest view of the most important data but still has access to the full range of data if they wish to see it. Accordingly, the context analyzer 348 correlates objects within system events to additional objects known to exist. For example, the context analyzer 348 may correlate an actor, victim, and/or event type to one or more originating processes, devices, and users. Such a correlation creates an audit trail for each individual event. As will be described later, this audit trail allows an administrator, at an end recipient 220 for example, to forensically track back any event which occurs to what triggered it. Accordingly, this additional information, including the originating processes, devices, and user, allows a contextual state to be established for each event. As each contextual state is established, the contextual state may be cached and aggregated to be quickly queried in subsequent lookups further reducing latency and improving the performance of the system.

After the context analyzer completes, the sensor agent 208 may attempt to establish a global perspective for each event by calling the cloud database utilizing an infrastructure similar to the infrastructure discussed in U.S. application Ser. No. 13/372,375 filed Feb. 13, 2012, "Methods and Apparatus for Dealing with Malware" (US-2012-0260340-A1, but with an additional layer capable of responding in a highly scalable manner which avoids the overhead generally associated with the complex rule processing within the overall database. Such an additional layer may be named SkyMD5. The response from the SkyMD5 layer may include information related to the age, popularity, and determination of an object—whether it is known good, bad, or unknown. This data may then be normalized and appended to each relevant portion of the event line. Further lookups are performed for network activity, assessing the reputation and category of each website and IP address as they are contacted.

In addition, similar to the contextual analyzer, the global perspective unit may first determine whether or not global perspective information for the particular system event is available locally. For example, global perspective information may be cached or otherwise stored in the storage data 320. In addition, a TTL approach may be additionally utilized to reduce the amount of traffic, or calls, to the global perspective information server 216, by the global perspective unit 352 of the sensor agent 208. Accordingly, contextual state information may only be available locally for a specified period of time and/or specified number of system events.

The event priority module 358 may contain priority logic, or one or more rule sets, to associate a priority to one or more events. The event priority module may utilize information from the local aggregator and interpreter 344, the context analysis module 348, and the global perspective module 352, to determine, or otherwise assign, a priority to an event; such a priority may be based on a rule set. The rule set may be provided by an administration system, backend system, end recipient 220, or other component of a forensic system. For example, a rule set may determine that an event meeting certain conditions be assigned a priority according to a scale of severity. Such an event priority may then be added to an existing event line or data structure.

The event distributor 356 may batch and transmit the events to the end recipient 220 after the global perspective has been applied. Alternatively, or in addition, the event distributor 356 may batch and transmit the events to the end recipient 220 after an event priority has been determined for the event. In one implementation, the syslog protocol is used to send each event as a line of log data to be processed by an end recipient 220. The transmission of events requires an additional layer of asynchronous processing as the response time from the recipient cannot be allowed to slow down the higher level global perspective and contextual analysis work which is ongoing in other threads. Therefore, a transmission engine of the event distribute 356 builds the final event line, packages the event line together with information about the host itself, and then sends it directly into a separate queue where it will then be sent shortly after (usually a few seconds) while maintaining the pre-set timestamp of precisely when the event took place even if it is sent several seconds later. The separate queue may be a queue located in the storage data 320 and more specifically in the event store 328.

The bridge 222 may comprise a general purpose computer and/or server or other device or federated group of devices capable of supporting communications over a communication network 212. The bridge 222 may include a processor 382, memory 362, one or more user input devices 366, such as a keyboard and a pointing device, and one or more user output devices 378, such as a display, speaker, and/or printer. The bridge 222 may further include a communication interface 386 for communicating with another computing device 204, an end recipient 220, a global perspective information server 216, and/or the communication network 212. Processor 382 and memory 362 may be the same or similar as that which was described with respect to processor 316 and memory 304 respectively.

The data storage 370 may generally include storage for programs and data. For example, data storage 370 may provide storage for a cached event store 394 and/or the general operating system and other programs and data 374. Optionally, as indicated by the dashed line, the cached event store 394 may be separate and apart from the data storage 370. That is, the cached event store 394 functions independently and/or in cooperation with memory 362 and processor 382.

The bridge 222 may be a dedicated device residing locally on a network. The bridge 222 may aggregate communications to and from one or more computing system 204 such that information to and from sensor agent 208 is cached and stored at the cached event store 394, optimizing global perspective requests and other communications. Additionally, the bridge 222 may perform selective or intelligent caching of global perspective information such that subsequent lookups or requests of global perspectives may be served from the cached event data store 394. One or more components of the bridge 222 may communicate with one another utilizing a bus 390.

Figure 4:
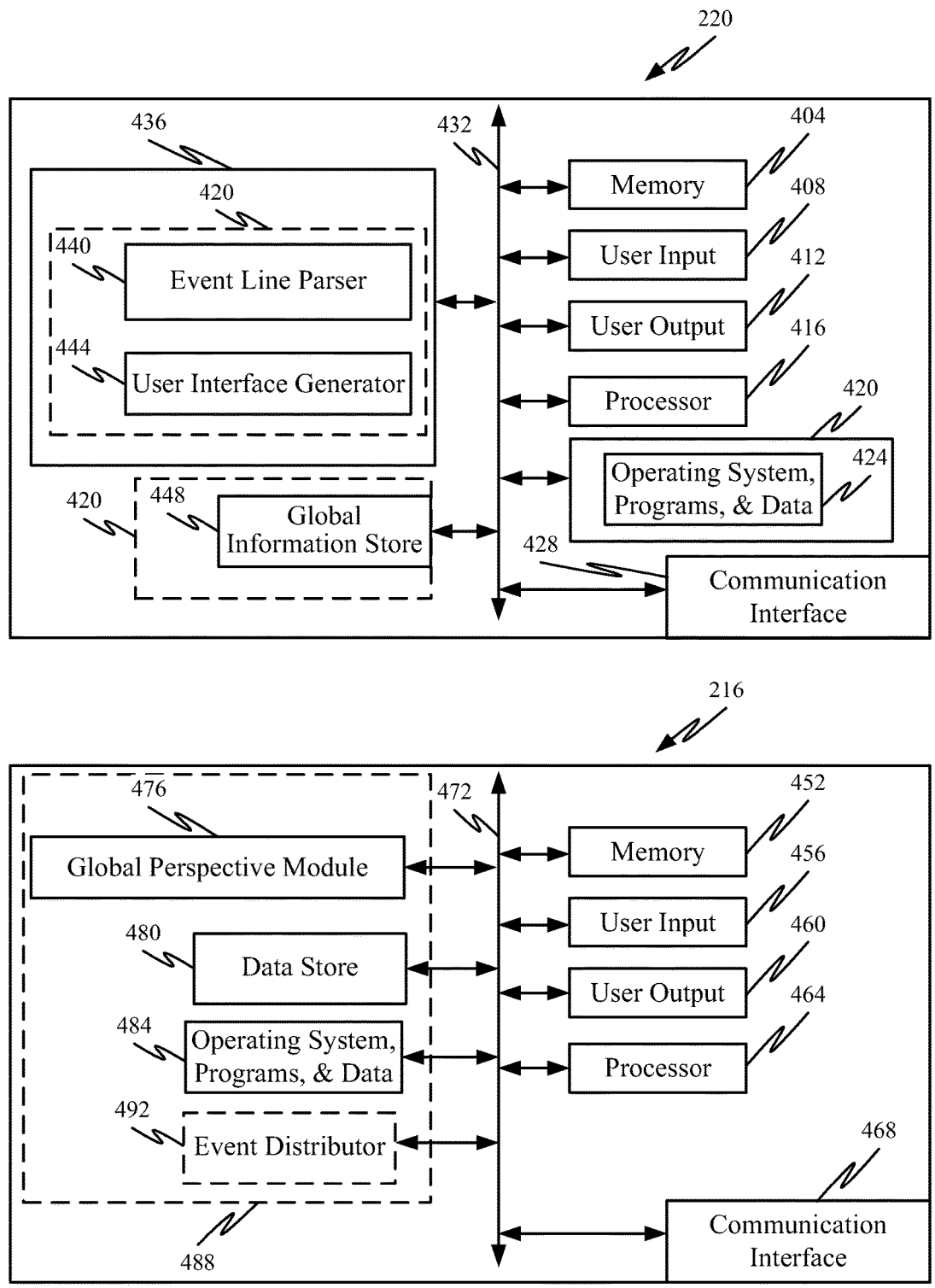
FIG. 4 illustrates a block diagram depicting details of a global perspective information server and an end recipient in accordance with an exemplary embodiment of the present disclosure.

FIG. 4 illustrates additional aspects of a system 200 in accordance with embodiments of the present invention, and in particular illustrates additional features and components of a global perspective information server 216 and an end recipient 220. The global perspective information server 216 may comprise a general purpose computer and/or server or other device or federated group of devices capable of supporting communications over a communication network 212. The global perspective information server 216 may include a processor 464, memory 452, one or more user input devices 456, such as a keyboard and a pointing device, and one or more user output devices 460, such as a display, speaker, and/or printer. The global perspective information server 216 may further include a communication interface 468 for communicating with another computing device 204, an end recipient 220, and/or the communication network 212. Processor 464 and memory 452 may be the same or similar as that which was described with respect to processor 316 and memory 304 respectively.

The data storage 488 may generally include storage for programs and data. For example, data storage 488 may provide storage for a global perspective module 476, data store 486, and/or the general operating system and other programs and data 484. Optionally, each of the global perspective module 476, the data store 486, and/or the event distributor 492 may be separate and apart from the data storage 488. That is, as indicated by the dashed line, each of the global perspective module 476, the data store 486, and/or the event distributor 492 functions independently and/or in cooperation with memory 452 and processor 464.

The global perspective module 476 provides global perspective information at the request of a sensor agent 208. For example, and as previously described, the sensor agent 208 may transmit a global perspective request 224 to the global perspective information server 216 requesting global perspective information for one or more system events having a contextual state. Accordingly, the global perspective module 476 may provide the global prospective information 228 to the global perspective unit 352 of the computing system 204. In addition, in some embodiments the event distributor functionality may reside at the global perspective information server 216. Accordingly, in such an embodiment, the global perspective module 476 may receive event information having contextual state information. In such an instance, the global perspective module 476 may provide the global perspective information and store the system event, contextual information, and global perspective information in data store 486. The event distributor 492 may then assemble the event line information, queue the event line for transmission, and transmit the event line to the end recipient 220. The event distributor 492 may function and/or operate in a manner similar to or the same as the event distributor 356 of the sensor agent 208. One or more components of the global perspective information server 216 may communicate with one another utilizing a bus 472.

The end recipient 220 may comprise a general purpose computer and/or server or other device or federated group of devices capable of supporting communications over a communication network 212. The end recipient 220 may include a processor 416, memory 404, one or more user input devices 408, such as a keyboard and a pointing device, and one or more user output devices 412, such as a display, speaker, and/or printer. The end recipient 220 may further include a communication interface 428 for communicating with another computing device 204, a global perspective information server 216, and/or the communication network 212. Processor 416 and memory 404 may be the same or similar as that which was described with respect to processor 316 and memory 304 respectively.

The end recipient 220 may further include data storage 420 which may include storage for programs and data. For example, data storage 420 may provide storage for an event line parser 440, a user interface generator 444, a global information store 448, and/or the general operating system and other programs and data 420. Optionally, as indicated by the dashed line, each of the event line parser 440, the user interface generator 444, and the global information store 448 may be provided separate and apart from the data storage 436 where each of the event line parser 440, a user interface generator 444, and the global information store 448 functions independently and/or in cooperation with memory 404 and processor 416. One or more components of the end recipient 220 may communicate with one another utilizing a bus 432.

The event line parser 440 may parse an incoming event line 244A-B and store the event lines, either parsed or whole, at the global information store 448. Accordingly, the end recipient 220 may utilize the parsed event line to generate an user interface utilizing the user interface generator 444. The generated user interface may then be displayed to a user at an user output device 412. The user interface generator 444 may create one or more dashboards that provide information to a user of the end recipient 220. Accordingly, dashboards may display correlated events collected by a sensor agent 204. Such correlated events may comprise File System/Disk activity, network activity, and registry activity on the endpoint along with the global community data and IP and domain reputation data to provide a complete point of view of the computing system 204 activity and further provide a full meaning to every single reported event. Accordingly, spotting and highlighting behaviours in the event data from computing systems 204 may potentially assist in finding and determining whether such activity is malicious or not.

Moreover, there may exist multiple dashboards each of which provide a specific heuristic that targets a specific potential malicious behaviour. For example, a first dashboard generally looks for executables that have been found and executed from specific critical paths in the computing system 204; those paths that are known to host malware executables (browser's cache, temporary files folder, system32 folder, auto start folder and so on). The dashboard may filter those files determined as good, unknown and bad from global community information. For unknown files, the dashboard may show their popularity at the global community, i.e. on how many computing systems 204 they have been seen—and if they establish outbound internet connections. If such files connect to the Internet, the dashboard may trace down and identify the specific connection and geolocate the destination address on a world map.

In another embodiment, a separate dashboard may analyze outbound connections from the analyzed endpoints. Accordingly, this dashboard may filter out and highlight connections to high-risk countries, i.e. those countries known to host malicious servers, and retrieve software that actually established the suspicious connections. The dashboard may also provide another point of view; that is, the dashboard may highlight all connections to specific IPs and domains that have been set up recently (e.g. in the last 60 days). All connections may be shown on a map view and the contacted IPs and domains are crosschecked with a database to determine their reputation and website category (if known).

As another example, a dashboard may highlight potential exploits detected on the endpoint by monitoring the most common software usually installed on an average computing system 204 and targeted by exploit attacks. The dashboard may generally identify software like Java, Adobe Acrobat, Microsoft Office, Flash Player and monitor if such software is dropping executable files on the system. Accordingly, if the software behaves in this manner, such a behaviour should be considered a suspicious behaviour, as software should not be dropping any executable files on the system. If such an occurrence is detected, the dashboard may analyze the dropped executable for its popularity in the global community and then identify potential outbound connections established by the just-dropped executable. If an outbound connection is found, the dashboard retrieves the destination IP and renders, or draws, the location of the IP address on a map view, such as a world map.

As another example, a separate dashboard may highlight those new processes created on the monitored computing systems 204 that are undetermined and have only been recently seen in the global community. For every process, a lifetime scheme is assembled which allows the administrator to understand when the undetermined file firstly landed on the endpoint and for how long time it has been active on the system. This dashboard may further provide specific events triggered by the suspicious process while active on the system.

As another example, a dashboard may highlight system processes that have been found to establish concurrent connections to different IPs in less than a specific timeframe and/or threshold, such as one second. If found, the system processes may be suspect and deemed to host malicious code; such malicious code having been injected into the website. For every established connection, the dashboard may trace and identify the contacted country and the specific IP/domain. As another example, a dashboard may be generated by the user interface generator 448 such the dashboard monitors activities on remote storage services like Dropbox, showing the filename and size of the files being saved on a remote server. The dashboard may further monitor and identify sensitive or classified company data that may be in the process of being stolen or placed (i.e. saved, stored, etc.) on a non-approved storage location.

Figure 5A:
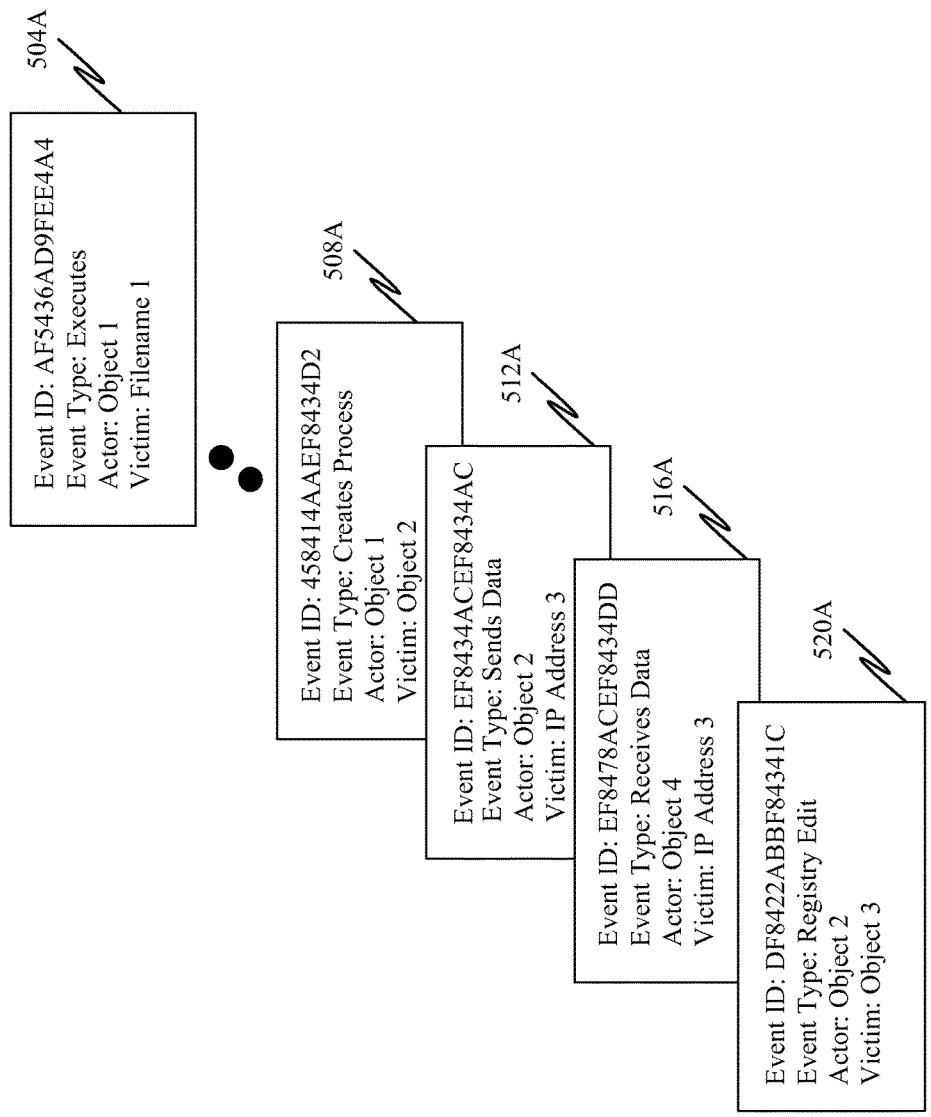
FIGS. 5A-C illustrates exemplary events, events having an applied contextual state, and events having an applied global perspective in accordance with an exemplary embodiment of the present disclosure.
Figure 5B:
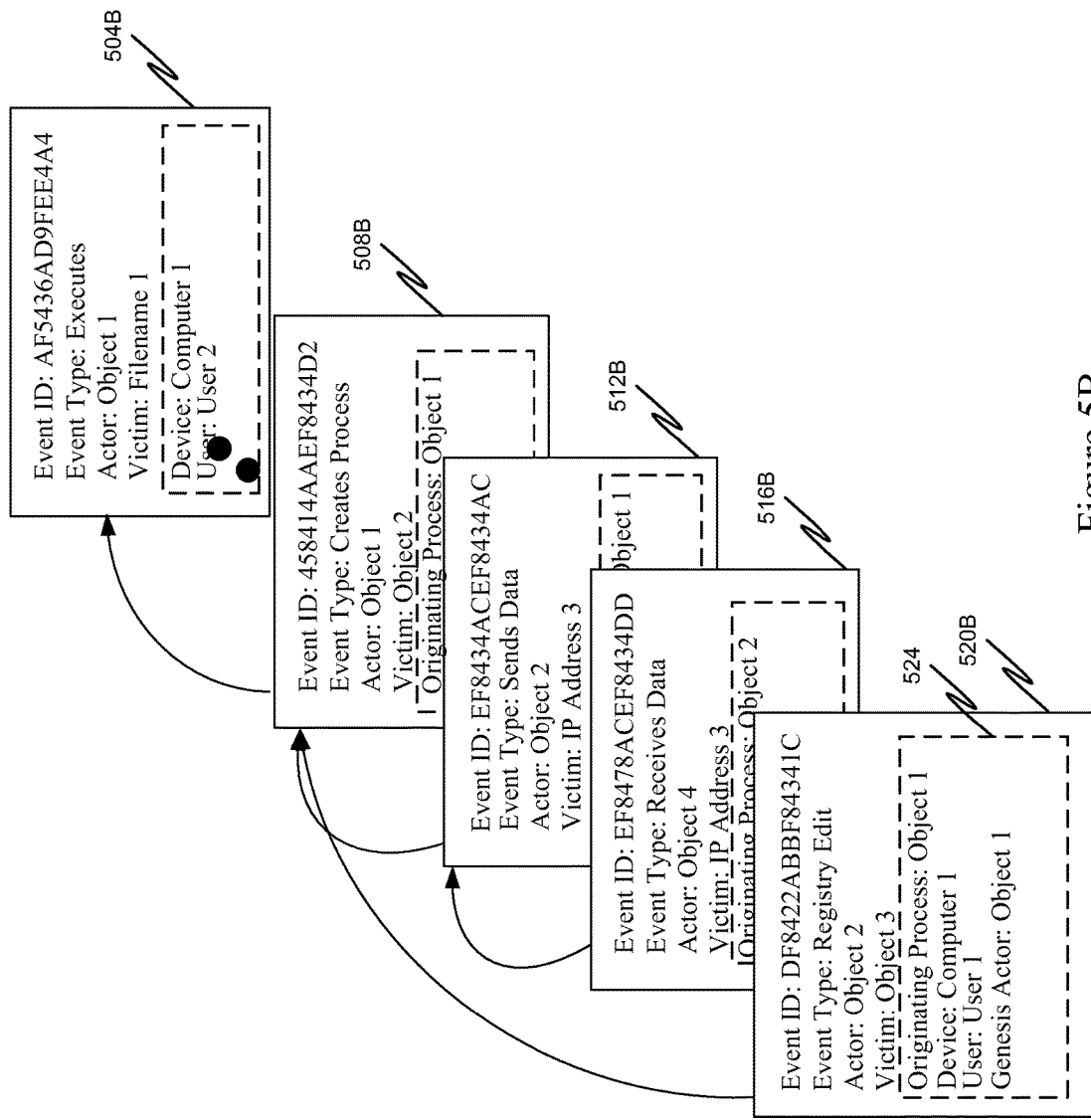
Figure 5C:
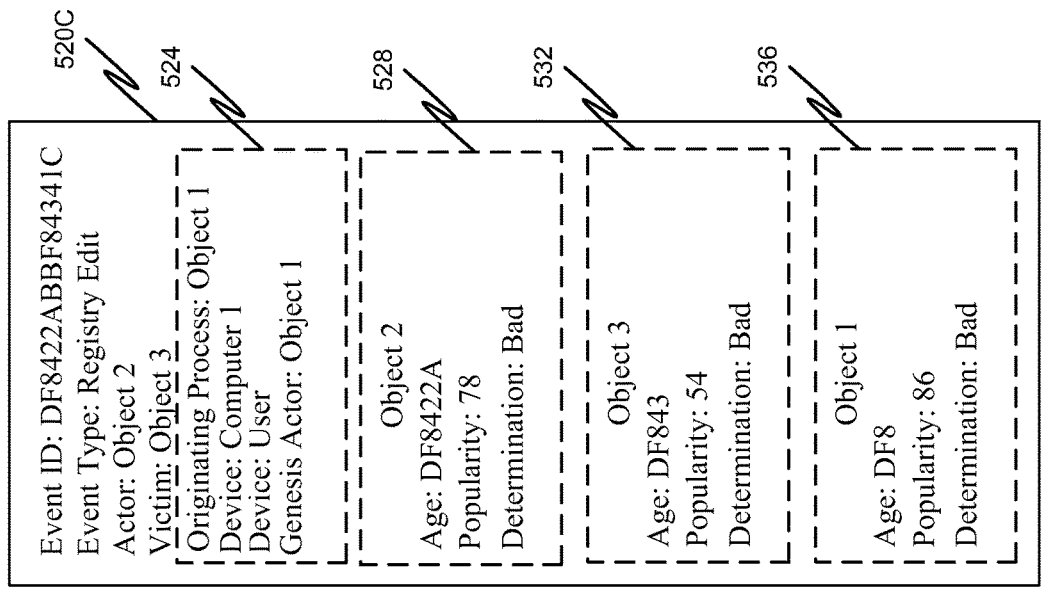

FIGS. 5A-5C illustrate additional aspects of a system 200 in accordance with embodiments of the present invention, and in particular illustrates event capturing, the application of contextual state, and the application of a global perspective to such captured events. For example, events 508A-520A are representative events that may have been captured by one or more system filters 340 of a sensor agent 204. The system events 504A-520A may include an Event ID, an Event Type, an Actor and a Victim. Although not illustrated, a timestamp may also be included in the event. As previously described, the actor and the victim may comprise objects. For example, in the system event 520A, an event type of Registry Edit is captured where Object 2 is modifying Object 3; accordingly, Object 3 may be the registry hive, a specific registry entry, and/or a specified registry value. Moreover each of the Event ID, Event Type, Actor, and Victim may be hashed resulting in a key that uniquely identifies the data.

As illustrated in FIG. 5B, a contextual analysis may be applied to the captured events 504B-520B. Accordingly, a context 520B comprising an origination proceess, Device, User, and in some instances, a GenesisActor may further supplement or enhance the Event ID, Event Type, Actor, and Victim. Although illustrated as including an originating process, GenesisActor, device, and user, the contextual information forming the contextual state 520B may include more or less information and in varying combinations. Moreover, as illustrated in FIG. 5B, the originating process or object may determined based on a previous event that initiated or otherwise created the current process and/or object. Additionally, as illustrated in FIG. 5B, the GenesisActor is determined based on a chain of previous events. For example, the Actor of Object 1 for system event 504B of Event Type "executes" operates on Filename 1. Object 1 subsequently creates a process Object 2 in 508B which is further utilized in both 516B and 520B. Accordingly, as the Object 1 initiated subsequent events, Object 1 may be determined to be the GenesisActor for 520B, 516B, 512B, and 508B.

As illustrated in FIG. 5C, a global perspective is applied to event 520C. The global perspective may comprise information for each object in the event and/or the contextual state 524. For example, a global perspective may be obtained for Object 2, Object 3, and Object 1 as illustrated. Accordingly, a global perspective 528 indicating the age of Object 2, the popularity of Object 2, the determination of Object 2, and/or additional IP/URL information of Object 2 may be provided. Similar global perspective information 532, 536 may be obtained for Object 3 and Object 1 respectfully. Accordingly, an event line may be assembled utilizing the event information, contextual state, and global perspective information. In addition, the global perspective may provide additional information pertaining to an IP/URL address. For example, such information may include a categoryID of the IP/URL, a confidence of such a categoryID, a reputation, geolocation information such as which country the IP/URL is associated with, and/or a threat history associated with the IP/URL.

Figure 6:
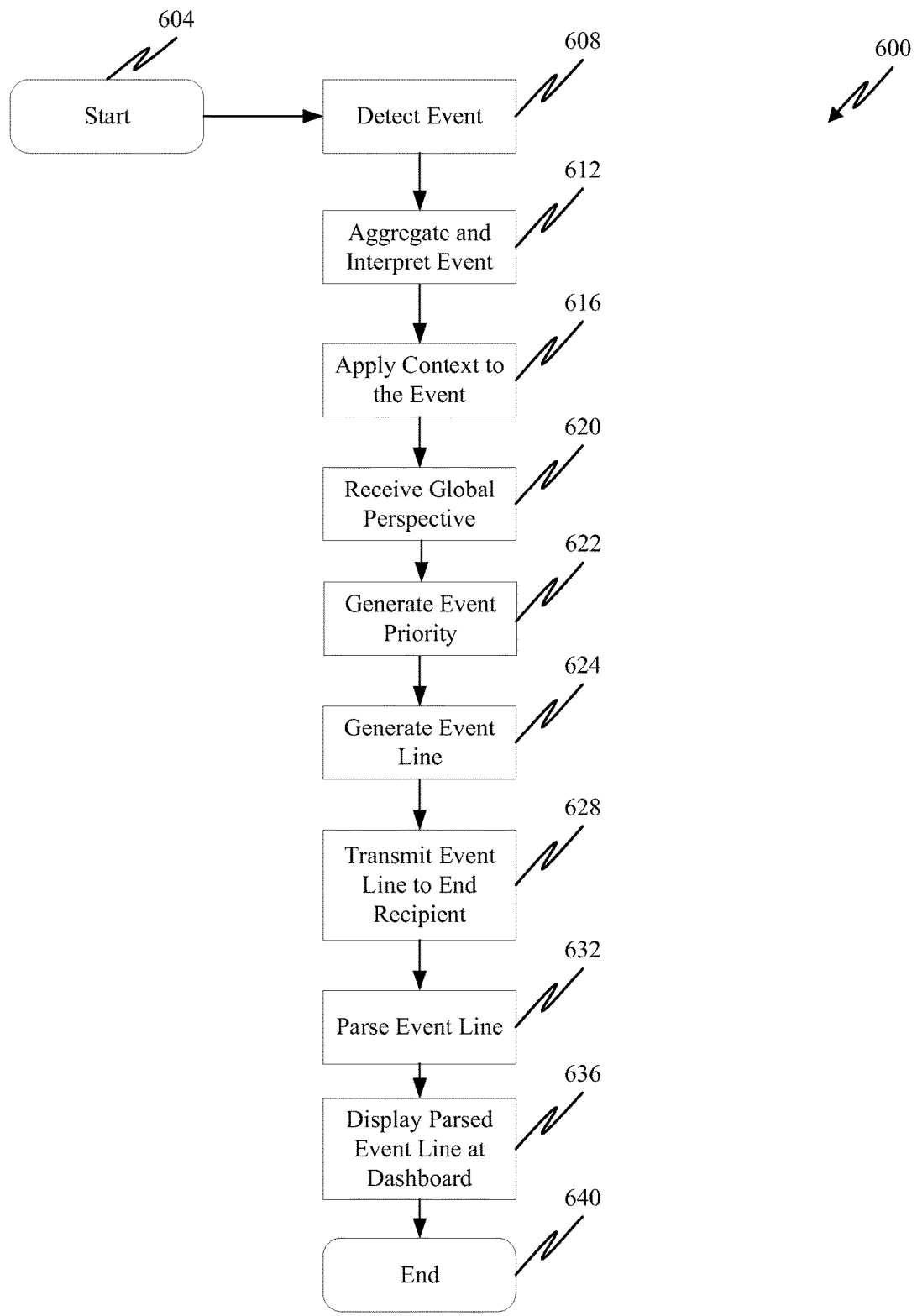
FIG. 6 illustrates a flow chart depicting details of at least one embodiment in accordance with an exemplary embodiment of the present disclosure.

Referring now to FIG. 6, a method 600 for providing forensic visibility into a system is provided in accordance with embodiments of the present disclosure. Method 600 is in embodiments, performed by a device, such as the sensor agent 204 and/or the end recipient 220. More specifically, one or more hardware and software components may be involved in performing method 600. In one embodiment, one or more of the previously described units perform one or more of the steps of method 600. The method 600 may be executed as a set of computer-executable instructions executed by a computer system and encoded or stored on a computer-readable medium. Hereinafter, the method 600 shall be explained with reference to systems, components, units, software, etc. described with FIGS. 1-5C.

Method 600 may continuously flow in a loop, flow according to a timed event, or flow according to a change in an operating or status parameter. Method 600 is initiated at step 604 where events of a computing system 204 may be initiated. At step 608, such an event may be detected. As previously discussed, the events, which may comprise system events, may be detected by one or more system filters 340 of a sensor agent 208. The sensor agent 208 may be comparatively small compared with other commercially available forensic tools and anti-malware software. This may be achieved by the sensor agent 204 being developed in a low-level language, having direct access to system resources such as the video display, disk, memory, the network(s), and without the incorporation of many standard code or dynamic linked libraries to perform these functions. Memory usage may be optimized by storing data in a local database structure that provides the ability to refer to objects by a unique identifier rather than requiring full filenames or signatures. All unnecessary dynamic link libraries are unloaded from the process immediately as they are identified as no longer being used, and background threads are merged to reduce CPU usage. A small, efficient sensor agent 204 may be deployed more quickly and may be used alongside other programs, including other security programs, with less load on or impact on the computer's performance. This approach also has the advantage of having less surface area for attack by malware making it inherently more secure.

Method 600 then proceeds to step 612 where the local aggregator and interpreter 344 receives events from the low level system filters 340, collecting them in batches from the queues in which they are inserted in real-time. As previously discussed, intelligent caching may be invoked to drop events which are duplicates of recent events. Further, some data normalization may be performed at step 612 to ensure consistency. Further still, caching may be implemented sparingly but in critical areas to ensure redundant events are not continually reported. Method 600 then proceeds to step 616 where a contextual state may be applied by a context analyzer 348 to the event information. Accordingly, the context analyzer correlates events to objects such that an audit trail for each individual event is created. As a contextual state is established, it is cached and aggregated to be quickly queried in subsequent lookups further reducing latency and improving the responsiveness of the system. Once a contextual state is applied, method 600 then proceeds to step 620 where a global perspective is applied for each event and/or each object of the event and contextual state. Accordingly, information related to the age, popularity, and determination of an object—whether it is known good, bad, or unknown is obtained. In addition, as previously mentioned, the global perspective may contain information pertaining specifically to an IP/URL address. For example, the global perspective may include information relating network activity and an assessment of the reputation and category of each website and IP address as they are contacted. This data may then be normalized. Method 600 then proceeds to step 622 where an event priority may be applied to the event. As previously discussed, the event priority may be obtained utilizing a rule set and applying such a rule set to aggregated event information, contextual state information, and global perspective information. Accordingly, method 600 then proceeds to step 624 where such data is appended to each relevant portion of an event line.

Method 600 may then proceed to step 628 where the event distributor 356 may transmit the event line 244 to the end recipient 220. The event distributor may first assemble the information and transmit the batched information after the global perspective has been applied. Once at the end recipient, the method 600 may then parse the event line at step 632 to filter out one or more events. Accordingly, the events may be stored in the data store 480. Method 600 may then display the parsed event line at one or more dashboards in accordance with step 636. Method 600 then ends at step 640.

Figure 7:
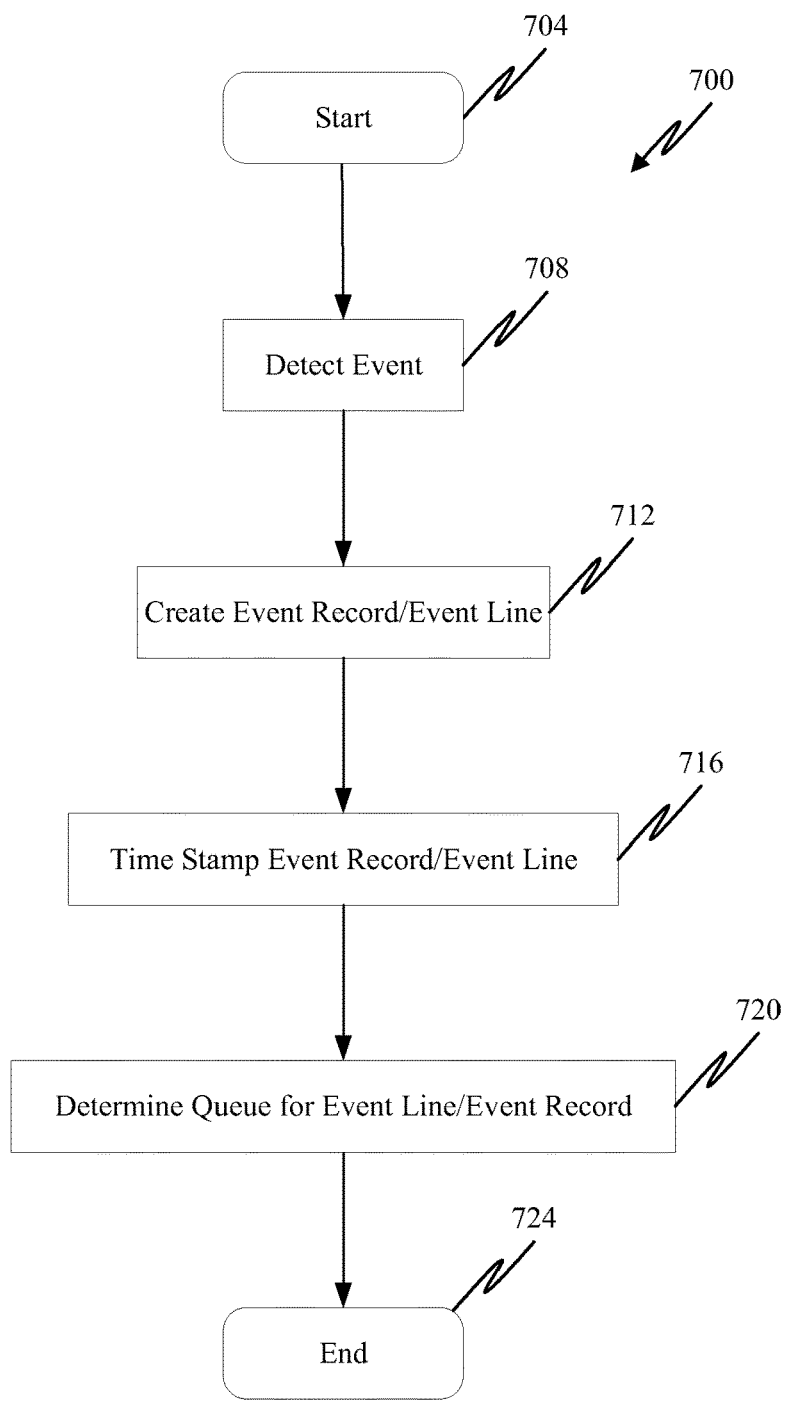
FIG. 7 illustrates a flow chart depicting operational details of a system filter in accordance with an exemplary embodiment of the present disclosure.

Referring now to FIG. 7, additional details regarding step 608 of method 600 is provided in method 700. Method 700 is in embodiments, performed by a device, such as the sensor agent 204 and/or the system filter 340. More specifically, one or more hardware and software components may be involved in performing method 700. In one embodiment, one or more of the previously described units perform one or more of the steps of method 700. The method 700 may be executed as a set of computer-executable instructions executed by a computer system and encoded or stored on a computer-readable medium. Hereinafter, the method 700 shall be explained with reference to systems, components, units, software, etc. described with FIGS. 1-6.

Method 700 may continuously flow in a loop, flow according to a timed event, or flow according to a change in an operating or status parameter. Method 700 is initiated at step 704 where events of a computing system 204 may be initiated. At step 708, such an event may be detected. As previously discussed, the events, which may comprise system events, may be detected by one or more system filters 340 of a sensor agent 208. Accordingly, at step 712, an event record may be created. The event record may be the same or similar to that which was described with respect to FIG. 5A. Accordingly, the event record may include an Event ID, and Event Type, an Actor, and a Victim. Moreover, in some embodiments, instead of creating a separate event record and a separate event line, a single event line for each event may be utilized. That is, the event record may be the event line. Accordingly, at step 716 the event line and/or the event record may be time stamped and stored. At step 720, method 700 may then determine which queue the event record or event line, should be assigned. In some embodiments, the event record/event line may be assigned to a specified queue based on the event type. Alternatively, or in addition, the event record/event line may be assigned to a specified queue based on the needed resources and the available resources. Method 700 then ends at step 724.

Figure 8:
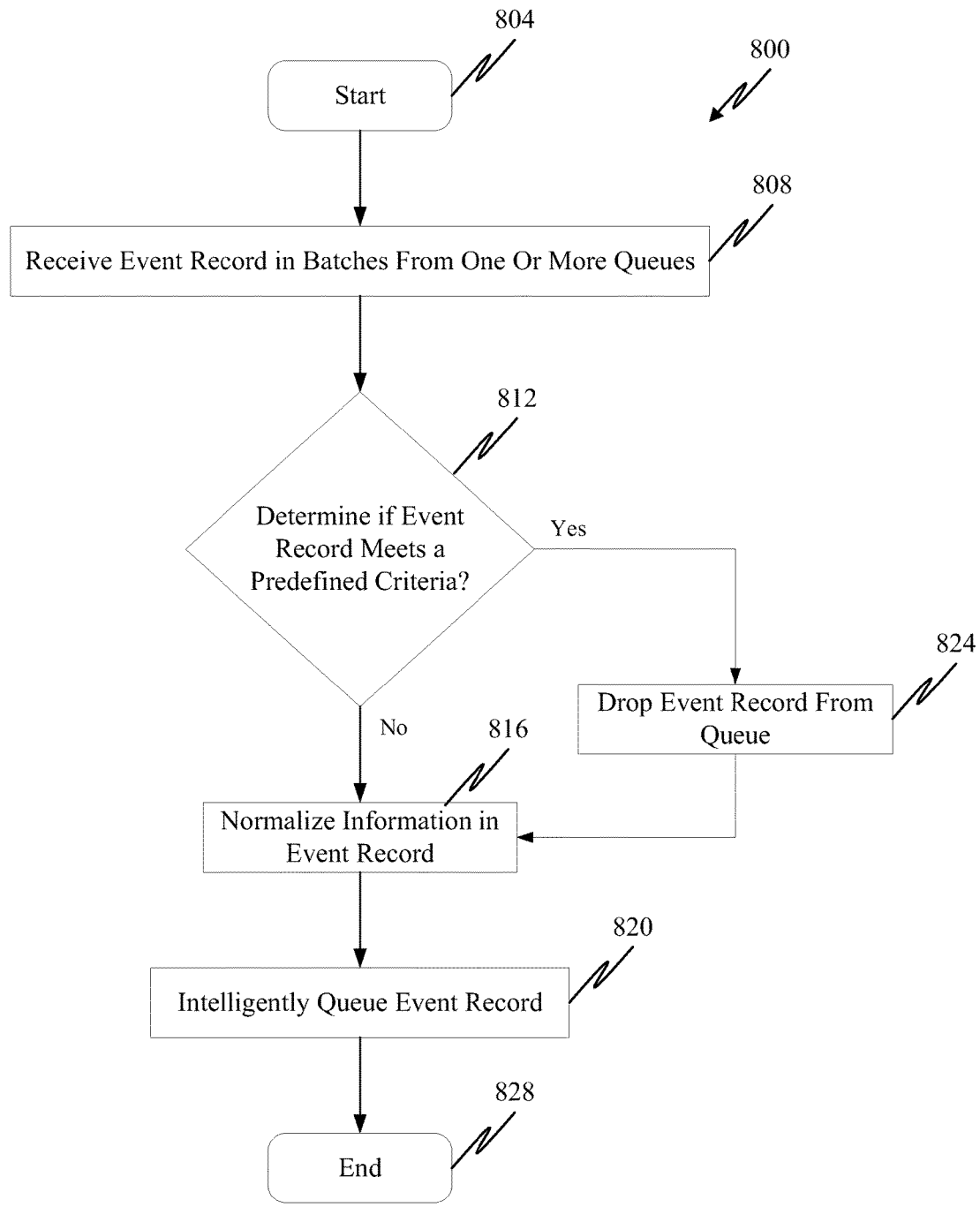
FIG. 8 illustrates a flow chart depicting operational details of a local aggregator and interpreter in accordance with an exemplary embodiment of the present disclosure.

Referring now to FIG. 8, additional details regarding step 612 of method 600 is provided in method 800. Method 800 is in embodiments, performed by a device, such as the sensor agent 204 and/or the local aggregator and interpreter 344. More specifically, one or more hardware and software components may be involved in performing method 800. In one embodiment, one or more of the previously described units perform one or more of the steps of method 800. The method 800 may be executed as a set of computer-executable instructions executed by a computer system and encoded or stored on a computer-readable medium. Hereinafter, the method 800 shall be explained with reference to systems, components, units, software, etc. described with FIGS. 1-7.

Method 800 may continuously flow in a loop, flow according to a timed event, or flow according to a change in an operating or status parameter. Method 800 is initiated at step 804. Method 800 then proceeds to step 808 where batches of event records/event lines are received form one or more previously described queues. For each event, method 800 proceeds to determine if the event record/event line meets a predefined criteria. For example, if the current event record/event line matches or is otherwise the same as a previous event record/event line, method 800 may proceed to step 824 where the current event record/event line may be dropped. Alternatively, or in addition, the dropped event record/event line may be modified such that either the contextual analyzer 348 and/or the global perspective unit 352 may be able to determine a contextual state and global perspective based on a previously captured event record/event line. Alternatively, or in addition, the dropped event record/event line may be modified to refer to a previously captured event record/event line such that upon parsing by the end recipient 220, the current event line/event record is provided meaning from a previously parsed event record/event line Accordingly, method 800 may then proceed to step 816 where the information may be normalized. The normalization may be implemented with a database which takes complete path names and translates them to representatives paths. So, for example, the Windows\file.exe would end up normalized to %windir%\file.exe, allowing rules to be created for any full path. Similar logic is utilized for paths like %appdata% which would have unique elements per-user and would be difficult to manage if not normalized. Accordingly, once the information in the event record/event line is normalized, method 800 may proceed to step 820 where the events may be intelligently queued. For instance, each event record/event line may be placed in a queue according to an event type. Method 800 may then end at step 828.

Figure 9:
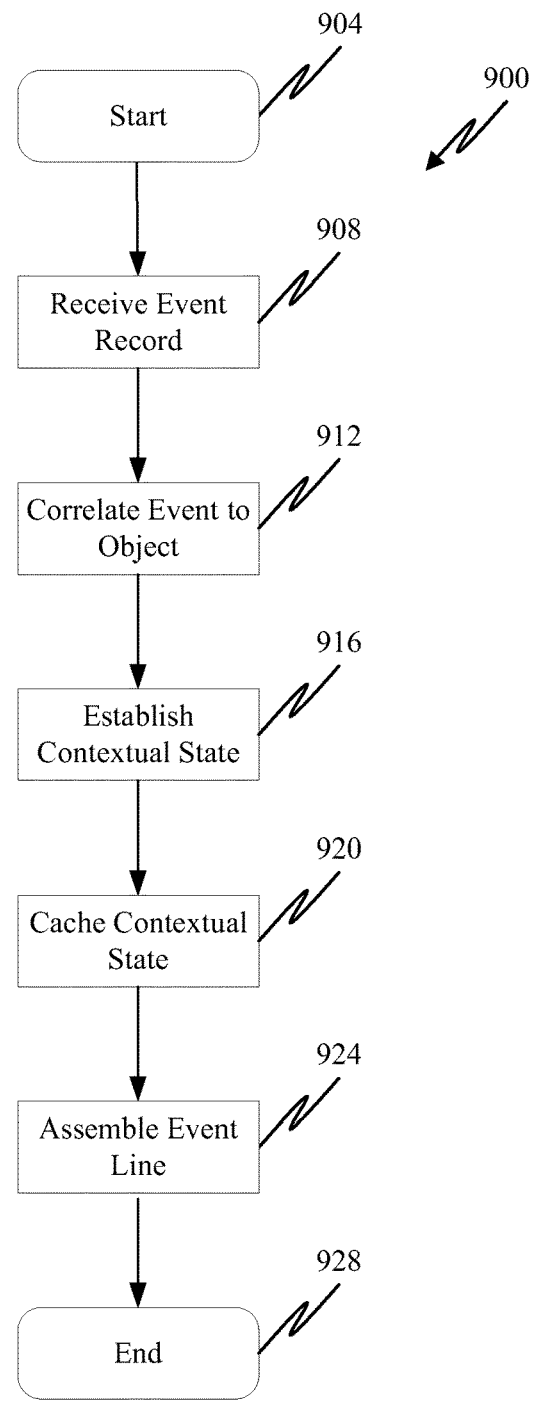
FIG. 9 illustrates a flow chart depicting operational details of a context analyzer in accordance with an exemplary embodiment of the present disclosure.

Referring now to FIG. 9, additional details regarding step 616 of method 600 is provided in method 900. Method 900 is in embodiments, performed by a device, such as the sensor agent 204 and/or the context analyzer 348. More specifically, one or more hardware and software components may be involved in performing method 900. In one embodiment, one or more of the previously described units perform one or more of the steps of method 900. The method 900 may be executed as a set of computer-executable instructions executed by a computer system and encoded or stored on a computer-readable medium. Hereinafter, the method 900 shall be explained with reference to systems, components, units, software, etc. described with FIGS. 1-8.

Method 900 may continuously flow in a loop, flow according to a timed event, or flow according to a change in an operating or status parameter. Method 900 is initiated at step 904. Method 900 then proceeds to step 908 where event records/event lines are received. Method 900 then proceeds to step 912 where objects of the event record/event line are correlated to objects in a contextual state. For example, and as illustrated in at least FIG. 5B, a contextual state may include originating processes, devices, and users. Accordingly, once objects of the event record/event line have been correlated, method 900 proceeds to step 916 where the event record/event line includes an established contextual state. In some embodiments consistent with the present disclosure, the contextual state may already be cached and may be obtained based on the event record/event line information. As one example, based on the event type, actor, and victim, it may be possible to recover a contextual state that includes an originating process, the device, and the user. However, not all cached instances of cached contextual state will suffice as different users may utilize a computing device 204.

Method 900 then proceeds to step 920 where the contextual state may be cached and made accessible for later access. In accordance with at least one embodiment, the event line may be partially assembled where the partially assembled event line may include various combinations of the event type, the actor object, the victim object, and the origination process. Accordingly, the partially assembled event line may later be passed to a global perspective information server. As such, method 900 ends at step 928.

Figure 10:
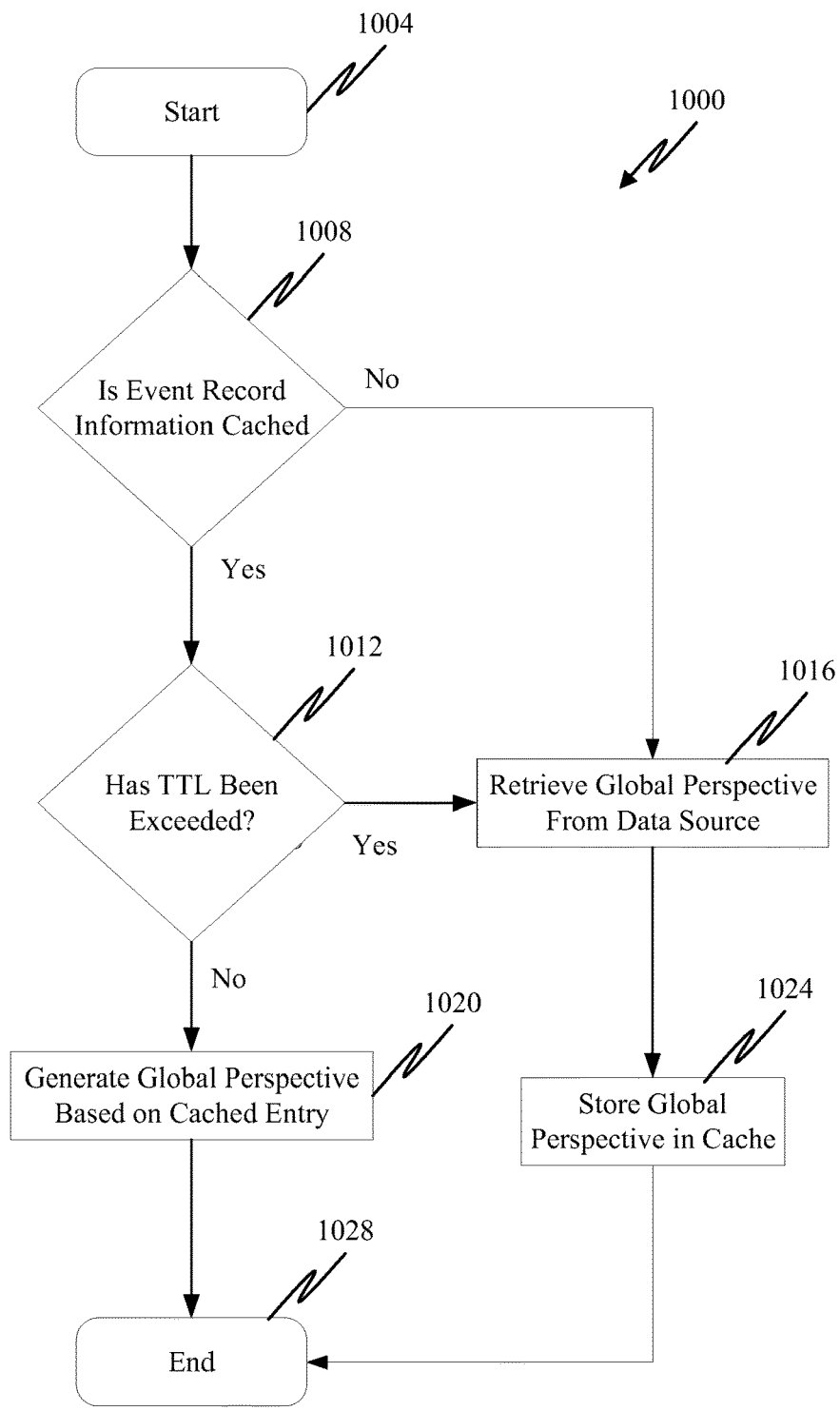
FIG. 10 illustrates a flow chart depicting operational details of a global perspective unit and/or global perspective module in accordance with an exemplary embodiment of the present disclosure.

Referring now to FIG. 10, additional details regarding step 620 of method 600 is provided in method 1000. Method 1000 is in embodiments, performed by a device, such as the sensor agent 204 and/or the global perspective unit 352, the global perspective module 476, and/or the global perspective information server 216. More specifically, one or more hardware and software components may be involved in performing method 1000. In one embodiment, one or more of the previously described units perform one or more of the steps of method 1000. The method 1000 may be executed as a set of computer-executable instructions executed by a computer system and encoded or stored on a computer-readable medium. Hereinafter, the method 1000 shall be explained with reference to systems, components, units, software, etc. described with FIGS. 1-9.

Method 1000 may continuously flow in a loop, flow according to a timed event, or flow according to a change in an operating or status parameter. Method 1000 is initiated at step 1004. Method 1000 then proceeds to step 1008 where method 1000 determines whether event record/event line information is cached. Such a determination may be based upon whether the event information, such as the event type, the actor, and/or the victim, match a predetermined criteria. For instance, not all event types may be cached. In one embodiment, global perspective information caching will cache a specific number of event types occurring within a specified time period. In other instances, all global perspective information for all events may be cached. Accordingly, if it is determined that global perspective information is not cached, method 1000 proceeds to step 1016 where the global perspective information server may be contacted. Accordingly, such a request may provide the global perspective information server 216 with information in an event record and/or a partially assembled event line. Accordingly, the global perspective information or a particular event may be retrieved. The retrieved global perspective information may then be stored at step 1024. For example, such information may be stored in event store 328.

Otherwise, if global perspective information is cached for an event record/event line, the method 1000 may proceed to step 1012 were method 1000 may determine whether a time-to-live (TTL) has been exceeded. In some instances, the cached information may expire based on the frequency of occurrence for a particular event. For example, if an event occurs with a high frequency, the global perspective unit 352 may determine that for efficiency reasons, either resources and/or bandwidth, caching for a particular event would be beneficial to improving the overall efficiency of the sensor agent 208 and/or computing device 204. Accordingly, the method 1000 then proceeds to step 1020 where the global perspective for the event is retrieved based on the cached entry. Otherwise, if the occurrence of the same event happens at a reduced frequency such that it would not be beneficial to cache global perspective information, it might be more beneficial to directly lookup and retrieve such information directly from the global perspective information server 216. Accordingly, the method 1000 proceeds to step 1016 where global perspective information is received from the global perspective information server. In some instances, the cache of global perspective events may expire according to a predetermined time. At step 1024, method 1000 may proceeds to step 1028 where method 1000 ends.

Figure 11:
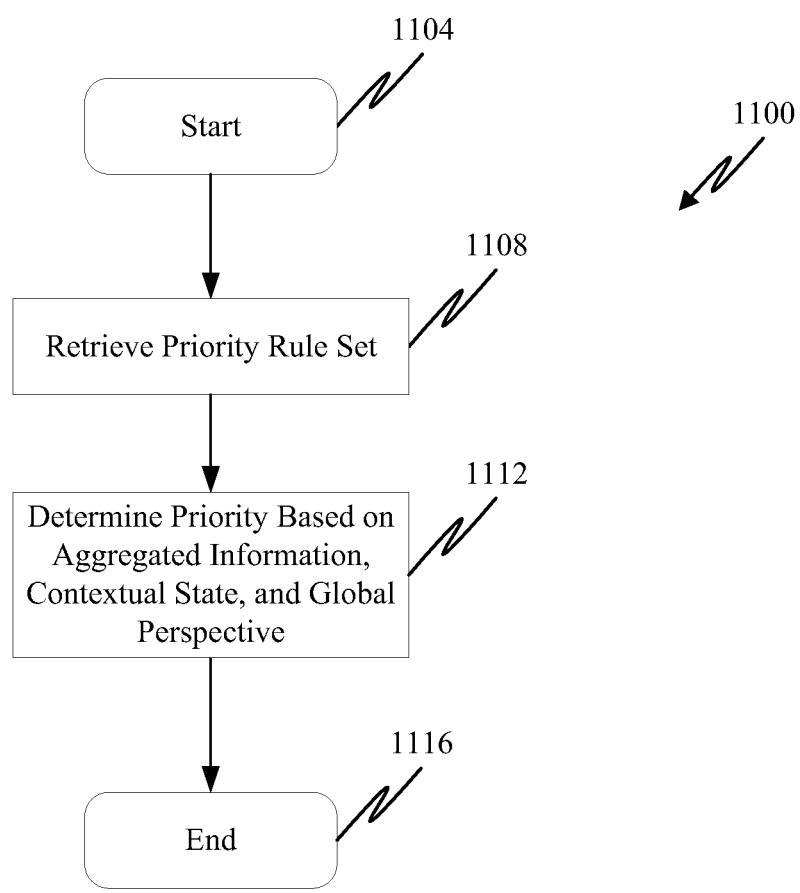
FIG. 11 illustrates a flow chart depicting operational details of an event priority generation unit in accordance with an exemplary embodiment of the present disclosure.

Referring now to FIG. 11, additional details regarding step 624 of method 600 is provided in method 1100. Method 1100 is in embodiments, performed by a device, such as the sensor agent 204. More specifically, one or more hardware and software components may be involved in performing method 1100. In one embodiment, one or more of the previously described units perform one or more of the steps of method 1100. The method 1100 may be executed as a set of computer-executable instructions executed by a computer system and encoded or stored on a computer-readable medium. Hereinafter, the method 1100 shall be explained with reference to systems, components, units, software, etc. described with FIGS. 1-10.

Method 1100 may continuously flow in a loop, flow according to a timed event, or flow according to a change in an operating or status parameter. Method 1100 is initiated at step 1104. Method 1100 then proceeds to step 1108 where a priority rule set is retrieved. The priority rule set may be retrieved directly from an administration system and/or may be received locally from a storage location associated with the sensor agent 208 and/or the data storage 320. The priority rule set may have one or more predefined criteria for assigning a priority level to an event. The priority level may represent a perceived severity or risk in which such an event poses. Method 1100 then proceeds to step 1112 where an event priority, or level, is assigned to the event.

Figure 12:
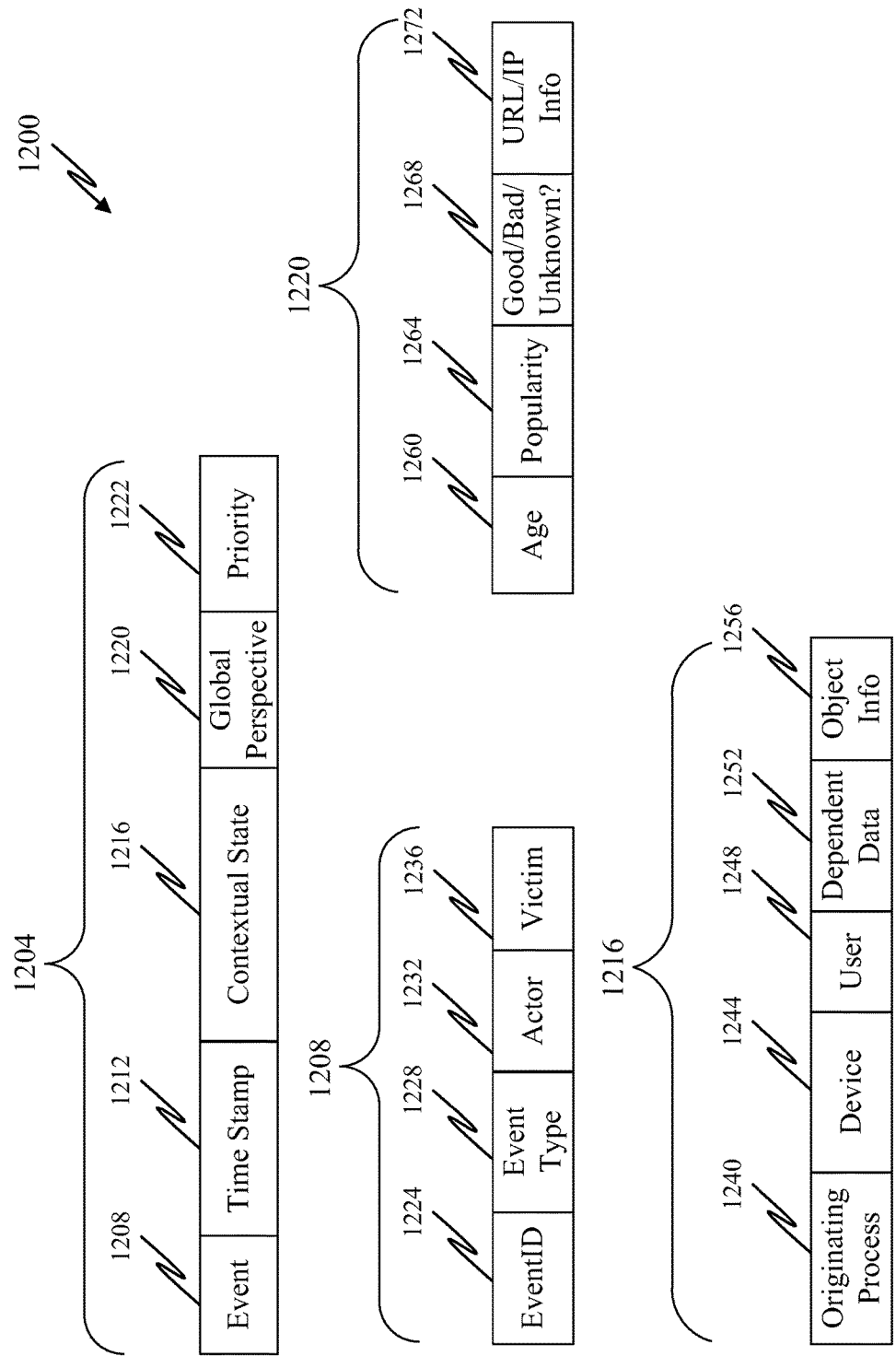
FIG. 12 depicts a first data structure employed in accordance with at least some embodiments of the present disclosure.

In at least one embodiment, the priority level may be derived from aggregated and interpreted event information from the local aggregator and interpreter 344, context analyzer 348, and global perspective unit 352. Accordingly, an event having a specified Actor, Victim, Target, originating process, or the like together with a global perspective indicating that at least one of the Actor, Victim, Target, origination process has been determined to be malware may result in a rule set that assigns a priority level to the event indicating that such the event should be immediately brought to the attention of an administrator. Accordingly, the event may be said to have a "high" priority or be a "high" priority event. Method 1100 may then end at step 1116. With reference to FIG. 12, details of a data structure 1200 will be described in accordance with embodiments of the present disclosure. In some embodiments, the data structure 1200 may be used as an event line and may contain details specific to an event, context, and global perspective. For example, an event line 1204 may generally include, without limitation, event information 1208, a time stamp 1212, context state information 126, global perspective information 1220, and a priority level 1222, where the priority may be a value that ranges between a low and a high number. In some embodiments, the event field 1208 may further include Event ID information 1224, Event Type information 1228, Actor 1232, and Victim information 1236. In some embodiments, the context state 1216 may include, without limitation, Originating Process 1240 information, Device information 1244, User information 1248, dependent data such as, but not limited to additional meta data and/or ancillary data describing or containing detailed information about one or more objects 1252, and object info 1256. In addition, the global perspective field may include, but is not limited to an age 1260, popularity 1264, malware determination 1268, and/or IP/URL information 1272, where IP/URL information may include, but is not limited to a categoryID of the IP/URL, a confidence of such a categoryID, a reputation, geolocation information such as which country the IP/URL is associated with, and/or a threat history associated with the IP/URL. Of course, additional relevant information may be included in the event line 1204 depending on the event.

Figure 13:
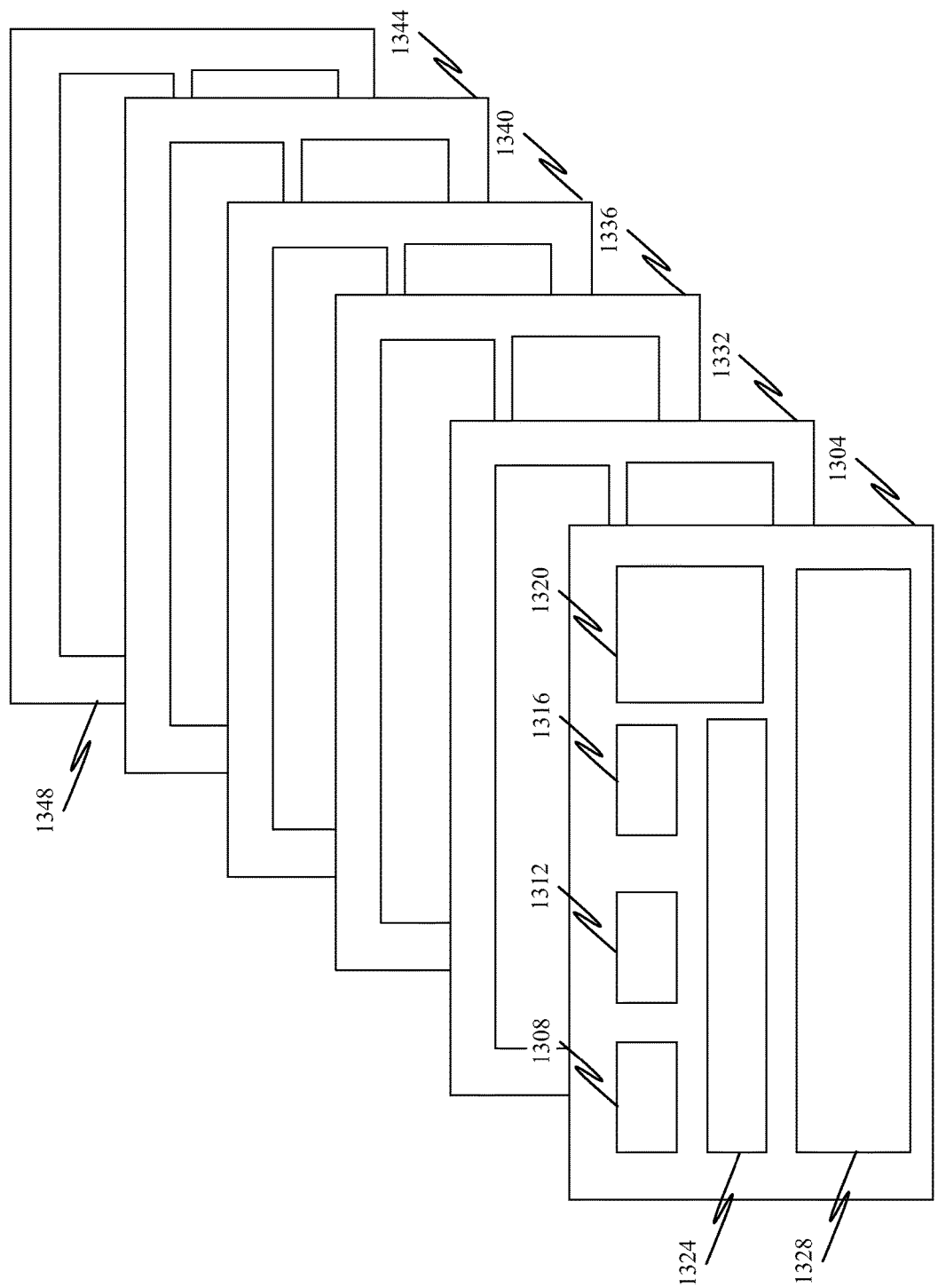
FIG. 13 depicts one or more dashboards in accordance with at least some embodiments of the present disclosure.

FIG. 13 generally illustrates exemplary user interfaces, or dashboards 1304, 1332, and 1336, which may be displayed at an end recipient 220 to a user at an user output device 412. The user interface generator 444 may create the one or more dashboards 1304, 1332, and 1336 to provide information from an event to a user of the end recipient 220. Accordingly, the dashboards 1304, 1332, and 1336 may display correlated events collected by a sensor agent 204. Such correlated events may comprise File System/Disk activity 1308, network activity 1312, and registry activity 1316 on the endpoint along with the global community data and IP and domain reputation data 1324 to provide a complete point of view of the computing system 204 activity and further provide a full meaning to every single reported event, including at least one of an originating process, an Event Type, a Target, a Victim, and a Actor. Accordingly, spotting and highlighting behaviours in the event data from computing systems 204 may potentially assist in finding and determining whether such activity is malicious or not.

Moreover, there may exist multiple dashboards 1304, 1332, and 1336 each of which provide a specific heuristic that targets a specific potential malicious behaviour. For example, a first dashboard 1326 generally looks for executables that have been found and executed from specific critical paths in the computing system 204; those paths that are known to host malware executables (browser's cache, temporary files folder, system32 folder, auto start folder and so on). The dashboard 1326 may filter those files determined as good, unknown and bad from global community information. For unknown files, the dashboard may show their popularity at the global community, i.e. on how many computing systems 204 they have been seen—and if they establish outbound internet connections. If such files connect to the Internet, the dashboard 1332 may trace down and identify the specific connection and geo-locate the destination address on a world map.

In another embodiment, a separate dashboard 1336 may analyze outbound connections from the analyzed endpoints. Accordingly, this dashboard may filter out and highlight connections to high-risk countries, i.e. those countries known to host malicious servers, and retrieve software that actually established the suspicious connections. The dashboard 1336 may also provide another point of view; that is, the dashboard 1336 may highlight all connections to specific IPs and domains that have been set up recently (e.g. in the last 60 days). All connections may be shown on a map view and the contacted IPs and domains are crosschecked with a database to determine their reputation and website category (if known).

As another example, a dashboard 1340 may highlight potential exploits detected on the endpoint by monitoring the most common software usually installed on an average computing system 204 and targeted by exploit attacks. The dashboard 1340 may generally identify software like Java, Adobe Acrobat, Microsoft Office, Flash Player and monitor if such software is dropping executable files on the system. Accordingly, if the software behaves in this manner, such a behaviour should be considered a suspicious behaviour, as software should not be dropping any executable files on the system. If such an occurrence is detected, the dashboard 1340 may analyze the dropped executable for its popularity in the global community and then identify potential outbound connections established by the just-dropped executable. If an outbound connection is found, the dashboard 1340 retrieves the destination IP and renders, or draws, the location of the IP address on a map view, such as a world map.

As another example, a separate dashboard 1344 may highlight those new processes created on the monitored computing systems 204 that are undetermined and have only been recently seen in the global community. For every process, a lifetime scheme is assembled which allows the administrator to understand when the undetermined file firstly landed on the endpoint and for how long time it has been active on the system. This dashboard 1344 may further provide specific events triggered by the suspicious process while active on the system.

As another example, a dashboard 1348 may highlight system processes that have been found to establish concurrent connections to different IPs in less than a specific timeframe and/or threshold, such as one second. If found, the system processes may be suspect and deemed to host malicious code; such malicious code having been injected into the website. For every established connection, the dashboard may trace and identify the contacted country and the specific IP/domain. As another example, a dashboard 1348 may be generated by the user interface generator 448 such the dashboard monitors activities on remote storage services like Dropbox, showing the filename and size of the files being saved on a remote server. The dashboard 1348 may further monitor and identify sensitive or classified company data that may be in the process of being stolen or placed (i.e. saved, stored, etc.) on a non-approved storage location.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method comprising:
   gathering an event defining an action of a first object acting on a target, wherein the first object is executed on a device;
   generating contextual state information for the event by correlating the event to an originating object of the first object;
   obtaining a global perspective for the event based on the contextual state information, wherein the global perspective comprises information associated with one or more of the first object and the originating object, and wherein the global perspective relates to one or more other events related to the event across a network;
   generating an event line comprising information relating to the event, wherein the information relates to at least one of the first object, the action of the first object, the target, and the originating object; and
   transmitting the generated event line.

2. The method of claim 1, wherein the information associated with the one or more of the first object and the originating object is obtained from a community database; and
   wherein the event line is transmitted to an end recipient.

3. The method of claim 1, further comprising:
   obtaining an event priority based on one or more of the generated contextual state information and the global perspective, wherein the event line further includes the event priority.

4. The method of claim 1, wherein the event includes information identifying the first object performing the action, information identifying the action being performed, and information identifying the target upon which the act is being performed.

5. The method of claim 4, further comprising:
   determining whether the global perspective for the event has been cached;
   when the global perspective for the event has been cached, obtaining the global perspective for the event based on the cached global perspective; and
   when the global perspective for the event has not been cached, obtaining the global perspective for the event from a community database.

6. The method of claim 5, further comprising:
   determining whether the cached global perspective for the event has expired, based on a time-to-live value associated with the cached global perspective; and
   when the global perspective for the event has expired, obtaining the global perspective for the event from the community database.

7. The method of claim 4, further comprising:
   heuristically displaying the information identifying the first object performing the action, the information identifying the action being performed, the information identifying the target upon which the act is being performed, and information associated with the global perspective according to one or more of:
   a location associated with the first object;
   at least one characteristic of an outbound connection associated with the first object;
   a dropped executable file;
   an age of the first object; and
   a number of concurrent connections associated with the first object.

8. The method of claim 1, wherein the global perspective comprises information comprises at least one of:
   an age;
   a popularity;
   a determination as to whether the first object is malware;
   a determination as to whether the originating object is malware;
   an Internet Protocol (IP) Address; and
   a Uniform Resource Locator (URL).

9. The system of claim 8, wherein the sensor agent is further operable to:
   cache the event and one or more other events; and
   asynchronously consolidate and normalize the event and the one or more other events.

10. A system for providing forensic visibility into a system, comprising:
    a device comprising:
    a communication interface;
    a processor;
    data storage; and
    a sensor agent stored on the data storage that is executable by the processor, wherein the sensor agent is operable to:
    gather an event defining an action of a first object acting on a target;
    generate contextual state information for the event by correlating the event to an originating object of the first object;
    obtain a global perspective for the event based on the contextual state information, wherein the global perspective comprises information associated with one or more of the first object and the originating object, and wherein the global perspective relates to one or more other events related to the event across a network;
    generate an event line comprising information relating to the event, wherein the information relates to at least one of the first object, the action of the first object, the target, and the originating object; and transmit the generated event line utilizing the communication interface.

11. The system of claim 10, wherein the event is executed by the processor.

12. The system of claim 10, further comprising:
a global perspective information server; and
an end recipient device, wherein the information associated with the one or more of the first object and the originating object is obtained from the global perspective information server and the sensor agent transmits the event line to the end recipient device.

13. The system of claim 10, wherein the event includes information identifying the first object performing the action, information identifying the action being performed, and information identifying the target upon which the act is being performed.

14. The system of claim 13, wherein the sensor agent is further operable to:
determine whether the global perspective for the event has been cached;
when the global perspective for the event has been cached, obtain the global perspective for the event based on the cached global perspective; and
when the global perspective for the event has not been cached, obtain the global perspective for the event from a community database.

15. The system of claim 14, wherein the sensor agent is further operable to:
determine whether the cached global perspective for the event has expired, based on a time-to-live value associated with the cached global perspective; and
when the global perspective for the event has expired, obtain the global perspective for the event from the community database.

16. The system of claim 13, wherein the end recipient device heuristically displays the information identifying the first object performing the action, the information identifying the action being performed, the information identifying the target upon which the act is being performed, and information associated with the global perspective according to one or more of:
a location associated with the first object;
at least one characteristic of an outbound connection associated with the first object;
a dropped executable file;
an age of the first object; and
a number of concurrent connections associated with the first object.

17. A system for providing forensic visibility into a system, comprising:
a first device comprising:
a communication interface;
a processor;
data storage; and
a sensor agent stored on the data storage that is executable by the processor, wherein the sensor agent is operable to:
gather an event defining an action of a first object acting on a target;
determine a global perspective for the event based on contextual state information for the event, wherein the global perspective relates to one or more other events related to the event across a network, and wherein the contextual state comprises an indication of an originating object of the first object and an indication of at least one of a second device on which the first object is executed and a user associated with the first object;
generate an event line comprising information relating to the event, wherein the information relates to at least one of the first object, the action of the first object, the target, and the originating object; and
transmit the generated event line utilizing the communication interface.

18. The system of claim 17, further comprising a global perspective information server comprising:
a processor;
a communication interface;
data storage; and
a global perspective module, wherein the global perspective module is operable to:
receive the event line from the device;
assemble a second event line including details associated with the event, wherein the second event line comprises information identifying the first object, information identifying the action of the first object, information identifying the target, and information identifying the originating object; and
transmit the second event line utilizing the communication interface to an end recipient.

19. The system of claim 18, wherein the end recipient heuristically displays the information identifying the first object, the information identifying the action of the first object, the information identifying the target, and information associated with the global perspective according to one or more of:
a location associated with the first object;
at least one characteristic of an outbound connection associated with the first object;
a dropped executable file;
an age of the first object; and
a number of concurrent connections associated with the first object.

20. The system of claim 17, further comprising a bridge comprising:
a processor;
a communication interface; and
a cached event store, wherein the cached event store is operable to:
receive a first request for a global perspective for the event;
receive a second request for a global perspective for another event, the second request originating from another device;
obtain a first global perspective for the event by obtaining information associated with one or more of the first object and the originating object;
obtain a second global perspective for the another event;
provide the first global perspective to the device; and
provide the second global perspective to the another device.

* * * * *

UNITED STATES PATENT AND TRADEMARK OFFICE
CERTIFICATE OF CORRECTION

PATENT NO. : 10,257,224 B2  
APPLICATION NO. : 15/437275  
DATED : April 9, 2019  
INVENTOR(S) : Joseph A. Jaroch et al.

Page 1 of 1

It is certified that error appears in the above-identified patent and that said Letters Patent is hereby corrected as shown below:

On the Title Page

(72) Inventors should read: Joseph A. Jaroch, Deer Park, IL (US);
Jacques Etienne Erasmus, Belper (GB);
Paul Barnes, Derby (GB);
Johannes Mayr, Linz (AT);
Michael Leidesdorff, Niwot, CO (US);
Marco Giuliani, Bastia Umbra (IT);
Christopher Jon Williams, Derbyshire (GB);
Chad Edward Bacher, Arvada, CO (US)

In the Specification

Column 1, Line 9, "patent application Ser. No. 14/270,069, filed May 5, 2014," should be
-- patent application Ser. No. 14/270,069 (now U.S. Patent No. 9,578,045), filed May 5, 2014, --

Signed and Sealed this
Twenty-first Day of May, 2019

Andrei Iancu
*Director of the United States Patent and Trademark Office*